United States Patent
Nakauma et al.

(10) Patent No.: US 10,980,268 B2
(45) Date of Patent: Apr. 20, 2021

(54) CONCENTRATED LIQUID FOOD

(71) Applicant: SAN-EI GEN F.F.I., INC., Toyonaka (JP)

(72) Inventors: Makoto Nakauma, Toyonaka (JP); Takahiro Funami, Toyonaka (JP)

(73) Assignee: SAN-EI GEN F.F.I., INC., Toyonaka (JP)

( * ) Notice: Subject to any disclaimer, the term of this patent is extended or adjusted under 35 U.S.C. 154(b) by 98 days.

(21) Appl. No.: 15/304,281

(22) PCT Filed: Apr. 17, 2015

(86) PCT No.: PCT/JP2015/061917
§ 371 (c)(1),
(2) Date: Dec. 6, 2016

(87) PCT Pub. No.: WO2015/159990
PCT Pub. Date: Oct. 22, 2015

(65) Prior Publication Data
US 2017/0099866 A1    Apr. 13, 2017

(30) Foreign Application Priority Data

Apr. 17, 2014 (JP) .............................. JP2014-085308

(51) Int. Cl.
| | | |
|---|---|---|
| *A23L 33/21* | (2016.01) | |
| *A23L 29/231* | (2016.01) | |
| *A23L 29/256* | (2016.01) | |
| *A23L 33/00* | (2016.01) | |
| *A23L 33/16* | (2016.01) | |
| *A23L 33/165* | (2016.01) | |
| *A23L 33/17* | (2016.01) | |
| *A23L 33/19* | (2016.01) | |

(52) U.S. Cl.
CPC ............. *A23L 33/21* (2016.08); *A23L 29/231* (2016.08); *A23L 29/256* (2016.08); *A23L 33/16* (2016.08); *A23L 33/165* (2016.08); *A23L 33/17* (2016.08); *A23L 33/19* (2016.08); *A23L 33/40* (2016.08); *A23V 2002/00* (2013.01)

(58) Field of Classification Search
CPC ........ A23L 33/21; A23L 33/16; A23L 33/165; A23L 29/231; A23L 33/01
See application file for complete search history.

(56) References Cited

U.S. PATENT DOCUMENTS

| 8,097,262 B2 | 1/2012 | Kuribayashi et al. |
| 2010/0040739 A1 | 2/2010 | Kuribayashi et al. |
| 2015/0045453 A1 | 2/2015 | Endo et al. |
| 2015/0290123 A1 | 10/2015 | Nakauma et al. |

FOREIGN PATENT DOCUMENTS

| JP | H 03-500170 A | 1/1991 |
| JP | 2000-169396 A | 6/2000 |
| JP | 2000-169397 A | 6/2000 |
| JP | 2005-513077 A | 5/2005 |
| JP | 2005-513079 A | 5/2005 |
| JP | 2006-141258 A | 6/2006 |
| JP | 2006-248981 A | 9/2006 |
| JP | 2007-077107 A | 3/2007 |
| JP | 2008-069090 A | 3/2008 |
| JP | 2009-153441 A | 7/2009 |
| JP | 2009-274964 A | 11/2009 |
| JP | 2009-291175 A | 12/2009 |
| JP | 2010-035517 A | 2/2010 |
| JP | 2010-077068 A | 4/2010 |
| JP | 2010-254598 A | 11/2010 |
| JP | 2013-199469 A | 10/2013 |
| WO | 89/01790 A1 | 3/1989 |
| WO | 2003/053165 A1 | 7/2003 |
| WO | 2003/053169 A1 | 7/2003 |
| WO | 2005/020717 A1 | 3/2005 |
| WO | 2013/146181 A1 | 10/2013 |
| WO | 2014/073675 A1 | 5/2014 |
| WO | 2014/209106 A1 | 12/2014 |

OTHER PUBLICATIONS

Ursekar et al., AAPS PharmSciTech, Sep. 2012, vol. 13, No. 3, p. 934. (Year: 2012).*
Synonyms for gelate, Definition of Gelate by Merriam-Webster, https://www.merriam-webster.com/dictionary/gelate#synonyms, accessed on Jun. 19, 2019. (Year: 2019).*
The Physics Hypertextbook, Viscosity, available on line at https://physics.info/viscosity, accessed on Jun. 19, 2019. (Year: 2019).*
Shozo Miyazaki, "Development of food additives with in situ gelling properties of ionic responsible intelligent polysaccharides", The Japan Food Chemical Research Foundation Annual Report No. 10, 2004, pp. 104-108.
Sakie Noda, et al., "Influence of the mannuronate/guluronate ratio on the gelation of sodium alginate solutions in the presence of calcium", Dai 55 Kai Rheology Toronkai Koen Yoshishu (Proceedings of the 55th Rheology Symposium), 2007, pp. 198-199.

(Continued)

*Primary Examiner* — James H Alstrum-Acevedo
*Assistant Examiner* — Kaipeen E Yang
(74) *Attorney, Agent, or Firm* — Sughrue Mion, PLLC

(57) ABSTRACT

An object of the present invention is to provide a concentrated liquid food that enables easy injection and suppresses gastro-esophageal reflux.
The object can be solved by a concentrated liquid food, comprising:
(A) a polysaccharide that becomes gelated or thickened by combining with calcium;
(B) a calcium source; optional (C) a chelating agent;
(D) a protein having emulsifiabilty; and
(E) a soybean hemicellulose,
(with the proviso that, when the calcium source (B) is a water-soluble calcium source, the concentrated liquid food comprises the chelating agent (C)),
wherein the concentrated liquid food has a viscosity of 250 mPa·s or less before contact with a simulated gastric fluid, and has a viscosity of 1,500 mPa·s or more after contact with a simulated gastric fluid.

12 Claims, No Drawings

(56) References Cited

OTHER PUBLICATIONS

International Search Report of PCT/JP2015/061917, dated Jul. 21, 2015. [PCT/ISA/210].
Extended European Search Report dated Dec. 5, 2017 from the European Patent Office in counterpart European Application No. 15779724.2.
Itoh, K., et al., "In situ gelling xyloglucan/alginate liquid formulation for oral sustained drug delivery to dysphagic patients", Drug Development and Industrial Pharmacy, 2010, vol. 36, No. 4, pp. 449-455 (pp. 2-8), XP009152381.

* cited by examiner

CONCENTRATED LIQUID FOOD

TECHNICAL FIELD

The present invention relates to a concentrated liquid food.

BACKGROUND ART

Nasogastric or oral tube feeding, or gastrostomy or jejunostomy tube feeding, have been conventionally used for patients and the elderly who have difficulty taking food by mouth. Nasogastric or oral tube feeding is a method of continuously injecting nutrients such as concentrated liquid food via a tube inserted from the nose or mouth into the esophagus, stomach, duodenum, or jejunum; and gastrostomy or jejunostomy tube feeding is a method of continuously injecting nutrients such as liquid food via a tube placed in an external fistula that is surgically or endoscopically created in a region from the esophagus to the jejunum (often the stomach).

Since patients and the elderly to whom tube feeding is applied often have a remarkably low function of the cardia at the upper stomach, gastro-esophageal reflux may occur when a concentrated liquid food in the stomach is in the state of a fluid. To prevent gastro-esophageal reflux, it is necessary to inject a concentrated liquid food at a low speed to a seated patient. At this time, the patient being fed must remain in the same seating position for a long period of time, and this imposes a great burden on care workers and the patient.

In contrast, when the concentrated liquid food is in the state of a gel, gastro-esophageal reflux can be suppressed; however, to inject the liquid food through a tube, a high pressure must be continuously applied by a pump or human power during the injection, which requires a special device and also imposes a great burden on care workers.

In order to prevent such gastro-esophageal reflux, or in order to alleviate the burden upon injection of liquid foods, various attempts have been made. More specifically, a tube-feeding nutritive food containing a gellan gum and alginic acid as gelling agents effective for preventing gastroesophageal reflux (Patent Document 1: JP2000-169396A), a tube-feeding nutritive food containing a carrageenan, and alginic acid (Patent Document 2: JP2000-169397A), a concentrated liquid food obtained by adding one or more kinds of a thickening material selected from low methoxyl pectin, gellan gum, alginate and the like so as to adjust the viscosity to 20-40 mPa·s, and a vomit preventing food consisting of the liquid food and a calcium aqueous solution obtained by dissolving a water-soluble calcium salt (Patent Document 3: JP2006-141258A), a gelling agent for nutritive preparations comprising a two-part liquid composed of a solution containing a low methoxyl pectin and a condensed phosphate salt; and a solution containing a bivalent or polyvalent metal salt, wherein the gelling agent gelatinizes a nutritive preparation by being mixed with the nutritive preparation before tube injection (Patent Document 4: JP2006-248981A), a gelling agent for the liquid nutritive food composed of carrageenan and a mixture of locust bean gum with an extract of devil's tongue and used in the form of a solution state (Patent Document 5: JP2007-77107A), a gel type enteral nutrient obtained by blending agar and an alginic acid and/or a salt thereof (Patent Document 6: JP2008-69090A), a tube injection thickener for a protein-containing liquid food comprising a pair of (A) a xanthan gum-containing solution and (B) a solution obtained by adding locust bean gum and/or glucomannan to a protein-containing liquid food, followed by heat treating at 80° C. or more (Patent Document 7: JP2009-153441A), a gel-like thick liquid diet or nutritional supplement satisfying conditions including a pH of 3-5, incorporation of 0.1-1 mass % of a water-soluble hemicellulose and/or HM pectin, and the like (Patent Document 8: JP2009-274964A), a gelling agent for an acidic thick liquid diet containing sodium alginate, a calcium salt insoluble/slightly soluble in neutral water, and a chelating agent (Patent Document 9: JP2009-291175$A_1$, a gelled tube feeding nutritious food containing ι-carrageenan as a gelling agent (Patent Document 10: JP2010-77068A), a method for mitigating or preventing vomiting comprising: mixing a calcium ion supplying agent with an enteral nutrient; tube-administering the resulting mixture; and, before or after the tube administration of the mixture, tube-administering a solution containing one or more substances selected from kappa-carrageenan, iota-carrageenan, sodium alginate, and alginic acid (Patent Document 11: JP-2010-254598A), an acidic gel-like enteral nutrient comprising (1) a protein, (2) an acidic polysaccharide, (3) one or more carrageenans selected from the group consisting of λ-carrageenan, ι-carrageenan, κ2-carrageenan, and carrageenans including μ-component and ν-component, wherein (4) the pH is adjusted to 2.5 to 6 (Patent Document 12: JP2013-199469A), an emulsified food product composition comprising (A) a lipid, (B) a thickener that gels in an acidic region, (C) at least one emulsion stabilizer selected from the group consisting of gum arabic and gum ghatti, and (D) a divalent metal salt (Patent Document 13: WO2013/146181A), and the like have been suggested.

CITATION LIST

Patent Documents

Patent Document 1: JP2000-169396A
Patent Document 2: JP2000-169397A
Patent Document 3: JP2006-141258A
Patent Document 4: JP2006-248981A
Patent Document 5: JP2007-77107A
Patent Document 6: JP2008-69090A
Patent Document 7: JP2009-153441A
Patent Document 8: JP2009-274964A
Patent Document 9: JP2009-29117A
Patent Document 10: JP2010-77068A
Patent Document 11: JP2010-254598A
Patent Document 12: JP2013-199469A
Patent Document 13: WO2013/146181

SUMMARY OF INVENTION

Technical Problem

However, in the techniques disclosed in the above documents, the injection must be performed by applying a constant pressure because of the gel form, or, even when constant pressure application is not necessary, the viscosity of the agent is not sufficiently high to prevent gastroesophageal reflux, thus requiring sequential injection of two liquids via a tube, thereby making the injection complicated. Further, the emulsified food product composition suggested in Patent Document 13 has limitations including that the protein source is a protein hydrolysate (low molecular substance), and that a calcium source is insoluble in the neutral range.

Accordingly, an object of the present invention is to provide a concentrated liquid food that can be simply injected and is not likely to cause gastro-esophageal reflux.

Solution to Problem

The inventors of the present invention found that a concentrated liquid food comprising a polysaccharide that becomes gelated by combining with calcium, calcium, a chelating agent, a protein having emulsifiability, and a soybean polysaccharide can be injected via a tube without constant pressure application, and can be smoothly injected by gravity fall, and that this concentrated liquid food is immediately gelated or thickened when it is mixed with gastric fluid, thereby suppressing gastroesophageal reflux. The inventors further found that these characteristics resolve the above problems, and also improve the effects of preventing aggregation and oil floating after storage (dispersion stability after storage), compared with previously known concentrated liquid foods. Based on such findings, the inventors completed the present invention.

Specifically, the present invention includes the following embodiments.

Item. 1. A concentrated liquid food, comprising:
(A) a polysaccharide that becomes gelated or thickened by combining with calcium;
(B) a calcium source;
optional (C) a chelating agent;
(D) a protein having emulsifiability; and
(E) a soybean hemicellulose,
(with the proviso that, when the calcium source (B) is a water-soluble calcium source, the concentrated liquid food comprises the chelating agent (C)),
wherein the concentrated liquid food has a viscosity of 250 mPa·s or less before contact with a simulated gastric fluid, and has a viscosity of 1,500 mPa·s or more after contact with a simulated gastric fluid.

Item 2. The concentrated liquid food according to item 1, wherein the (A) polysaccharide that becomes gelated or thickened by combining with calcium comprises one or more members selected from the group consisting of pectins and alginic acids or salts thereof.

Item 3. The concentrated liquid food according to Item 2, wherein the concentrated liquid food comprises the pectin in an amount or 0.5 mass % to 1.8 mass %.

Item 4. The concentrated liquid food according to Item 2 or 3, wherein the pectin has a weight average molecular weight ($M_w$) of 150,000 g/mol or less, and the pectin contains a pectin having a methyl esterification degree (DM) of 20% to 40% in an amount of 50 mass % or more.

Item 5. The concentrated liquid food according to Item 2 or 3, wherein the pectin comprises:
(1) a pectin having a weight average molecular weight ($M_w$) of 100,000 g/mol or less, and a methyl esterification degree (DM) of 40% or less, and
(2) a pectin having a $M_w$ of 100,000 g/mol or more Item 6. The concentrated liquid food according to any one of items 2 to 5, wherein the alginic acid or a salt thereof is sodium alginate.

Item 7. The concentrated liquid food according to any one of Items 2 to 6, wherein the concentrated liquid food contains an alginic acid or a salt thereof in an amount of 0.2 mass % to 1.2 mass %.

Item 8. The concentrated liquid food according to any one of Items 2 to 7, wherein the alginic acid or a salt thereof comprises:
(1) an alginic acid or a salt thereof having a weight average molecular weight ($M_w$) of 250,000 g/mol or less and a guluronic acid content of not less than 40% and less than 60%; and
(2) an alginic acid or a salt thereof having a weight average molecular weight ($M_w$) of 250,000 g/mol or less, and a guluronic acid content of 60% or more.

Item 9. The concentrated liquid food according to any one of items 2 to 7, wherein the alginic acid or a salt thereof comprises:
(1) an alginic acid or a salt thereof having a weight average molecular weight ($M_w$) of 100,000 g/mol or less, and a guluronic acid content of 60% or more; and
(2) an alginic acid or a salt thereof having a $M_w$ of 100,000 g/mol or more.

Item 10. The concentrated liquid food according to any one of Items 1 to 9, wherein the calcium source (B) is a water-soluble calcium source, and the concentrated liquid food comprises the calcium source (B) in an amount of, on a calcium basis, 0.005 mass % to 0.25 mass %.

Item 11. The concentrated liquid food according to any one of Items 1 to 10, wherein the calcium source (B) is a water-insoluble calcium source, and the concentrated liquid food comprises the calcium source (B) in an amount of, on a calcium basis, 0.005 mass % to 0.25 mass %.

Item 12. The concentrated liquid food according to any one of items 1 to 11, wherein the chelating agent (C) is citrate.

Item 13. The concentrated liquid food according to any one of Items 1 to 12, wherein the concentrated liquid food comprises the chelating agent (C) in an amount of 0.05 mass % to 2.0 mass %.

Item. 14. The concentrated liquid food according to any one of Items 1 to 13, wherein the protein having emulsifiability (D) is an unhydrolyzed protein derived from milk.

Item 15. The concentrated liquid food according to any one of Items 1 to 14, wherein the concentrated liquid food comprises the soybean hemicellulose in an amount of 0.2 mass % to 5.0 mass %.

Item 16. The concentrated liquid food according to any one of Items 1 to 15, wherein the tube fluidity measured by the tube fluidity measurement method detailed below is 300 mL/hour or more Tube Fluidity Measurement Method Step 1. 100 mL of a sample is placed in a 600-mL plastic bottle with an opening at an upper portion.

Step 2. A flexible silicone tube with an inner diameter of 4 mm and a length of 1000 mm is connected to the bottom of the plastic bottle.

Step 3. The bottom surface of the plastic bottle is placed 600 mm above the end of the tube so that the sample flows out only by gravity via the tube.

Step 4. The flow amount A (mL) of the sample that flows out in 2 minutes is measured with a measuring cylinder, and A×30 (mL/hour) is determined as the tube fluidity of the concentrated liquid food.

Item 17. The concentrated liquid food according to any one of Items 1 to 16, wherein the concentrated liquid food is used for injection through nasogastric or oral tube feeding, or gastrostomy or jejunostomy tube feeding.

Item 18. A method for improving storage stability of dispersibility of a concentrated liquid food, the method comprising incorporating in the concentrated liquid food,
(A) a polysaccharide that becomes gelated or thickened by combining with calcium;
(B) a calcium source;
optional (C) a chelating agent;

(D) a protein having emulsifiability; and (E) a soybean hemicellulose (with the proviso that, when the calcium source (B) is a water-soluble calcium source, the concentrated liquid food comprises the chelating agent (C)).

Item 19. The method according to Item 18, wherein the (A) polysaccharide that becomes gelated or thickened by combining with calcium comprises one or more members selected from the group consisting of pectins and alginic acids or salts thereof.

Item 20. The method according to Item 19, wherein the concentrated liquid food comprises the pectin in an amount of 0.5 mass % to 1.8 mass %.

Item 21. The method according to Item 19 or 20, wherein the pectin has a weight average molecular weight ($M_w$) of 150,000 g/mol or less, and the pectin contains a pectin having a methyl esterification degree (DM) of 20% to 40% in an amount of 50 mass % or more.

Item 22. The method according to Item 19 or 20, wherein the pectin comprises:

(1) a pectin having a weight average molecular weight ($M_w$) of 100,000 g/mol or less, and a methyl esterification degree (DM) of 40% or less, and (2) a pectin having a $M_w$ of 100,000 g/mol or more.

Item 23. The method according to any one of Items 19 to 22, wherein the alginic acid or a salt thereof is sodium alginate.

Item 24. The method according to any one of Items 19 to 23, wherein the concentrated liquid food comprises an alginic acid or a salt thereof in an amount at 0.2 mass % to 1.2 mass %.

Item 25. The method according to any one of Items 19 to 24, wherein the alginic acid or a salt thereof comprises:

(1) an alginic acid or a salt thereof having a weight average molecular weight ($M_w$) of 250,000 g/mol or less and a guluronic acid content of not less than 40% and less than 60%; and (2) an alginic acid or a salt thereof having a weight average molecular weight ($M_w$) of 250,000 g/mol or less, and a guluronic acid content of 60% or more.

Item 26. The method according to any one of Items 19 to 25, wherein the alginic acid or a salt thereof comprises:

(1) an alginic acid or a salt thereof having a weight average molecular weight ($M_w$) of 100,000 g/mol or less, and a guluronic acid content of 60% or more; and (2) an alginic acid or a salt thereof having a $M_w$ of 100,000 g/mol or more.

Item 27. The method according to Item 19, wherein the calcium source (B) is a water-soluble calcium source, and the concentrated liquid food comprises the calcium source (B) in an amount of, on a calcium basis, 0.005 mass % to 0.25 mass %.

Item 28. The method according to Item. 20, wherein the calcium source (B) is a water-insoluble calcium source, and the concentrated liquid food comprises the calcium source (B) in an amount of, on a calcium basis, 0.005 mass % to 0.25 mass %.

Item 29. The method according to Item 19, wherein the chelating agent (C) is citrate.

Item 30. The method according to any one of Items 18 to 29, wherein the concentrated liquid food comprises the chelating agent (C) in an amount of 0.05 mass % to 2.0 mass %.

Item 31. The method according to any one of Items 18 to 30, wherein the (D) protein having emulsifiability is an unhydrolyzed protein derived from milk.

Item 32. The method according to any one of Items 18 to 31, wherein the concentrated liquid food comprises the soybean hemicellulose (E) in an amount of 0.2 mass % to 5.0 mass %.

Item 33. The method according to any one of Items 18 to 32, wherein the tube fluidity measured by the tube fluidity measurement method detailed below is 300 mL/hour or more.

Tube Fluidity Measurement Method

Step 1. 100 mL of a sample is placed in a 600-mL plastic bottle with an opening at an upper portion.

Step 2. A flexible silicone tube with an inner diameter of 4 mm and a length of 1000 mm is connected to the bottom of the plastic bottle.

Step 3. The bottom surface or the plastic bottle is placed 600 mm above the end of the tube so that the sample flows out only by gravity via the tube.

Step 4. The flow amount A (mL) of the sample that flows out in 2 minutes is measured with a measuring cylinder, and A×30 (mL/hour) is determined as the tube fluidity of the concentrated liquid food.

Item 34. The method according to any one of Items 18 to 33, wherein the concentrated liquid food is used for injection through nasogastric or oral tube feeding, or gastrostomy or jejunostomy tube feeding.

Advantageous Effects of Invention

The present invention provides a concentrated liquid food that enables easy injection and suppresses gastro-esophageal reflux.

DESCRIPTION OF EMBODIMENTS

In this specification, the superscript "TM" denotes a trademark name.

The concentrated liquid food of the present invention contains a polysaccharide that becomes gelated by combining with calcium, a calcium, a chelating agent, a protein having emulsifiability, and soybean hemicellulose.

The "concentrated liquid food" of the present invention includes not only concentrated liquid foods (foods) but also enteral nutritions (pharmaceutical products).

The concentrated liquid food of the present invention comprises:

(A) a polysaccharide that becomes gelated or thickened by combining with calcium;

(B) a calcium source;

optional (C) a chelating agent;

(D) a protein having emulsifiability; and (E) a soybean hemicellulose, (with the proviso that, when the calcium source (B) contains a water-soluble calcium source, the concentrated liquid food contains the chelating agent (C)), wherein the concentrated liquid food has a viscosity of 250 mPa·s or less before contact with a simulated gastric fluid, and has a viscosity of 1,500 mPa·s or more after contact with a simulated gastric fluid.

1. Polysaccharide That Becomes Gelated or Thickened by Combining with Calcium

"Polysaccharide that becomes gelated or thickened by combining with calcium" used in the present invention is a substance widely used as a thickener as a food additive. The polysaccharide is not particularly limited insofar as, in the absence of calcium, it is dispersed in water in a pH range of 4.5 to 9.0 without being gelated, and, in the presence of calcium, it is gelated in a pH range of 4.0 or less.

Examples of such a polysacchande include pectin (preferably low methoxyl pectin), an alginic acid or a salt thereof, gellan gum, carrageenan and the like.

The concentrated liquid food of the present invention preferably contains, as the "polysaccharide that becomes gelated or thickened by combining with calcium," at least one member selected from the group consisting of pectins (preferably low methoxyl pectin) and alginic acids or salts thereof.

The "polysaccharide that becomes gelated or thickened by combining with calcium" used in the present invention is preferably at least one member selected from the group consisting of pectins (preferably low methoxyl pectin) and alginic acids or salts thereof.

1-1. Pectin

Pectin has galacturonic acid and rhamnose in the main chain, and forms a structure in which side chains mainly consisting of neutral sugars are bonded to the rhamnose in the main chain. Further, a part of the galacturonic acid, which constitutes the greatest part of the main chain, is esterified by methyl or acetyl. In this specification, the molar content m of the methyl-esterified galacturonic acid based on the total molar number of galacturonic acid is referred to as "degree of methyl esterification" or "DM." More specifically, for example, the limitation that "the degree of methyl esterification is 40% or less" or "the DM is 40% or less" means that the pectin contains 40% or less of methyl esterified galacturonic acid in terms of molar content. The degree of methyl esterification (DM) may be measured by the method used in the Examples of this specification.

The DM of pectin varies depending on the type of plant from which the pectin was extracted, the season of extraction, and the like; however, upon extraction, the pectin contains a large amount of methyl ester, and has a DM of 50% or more. This pectin is referred to as a high methoxyl pectin (HM pectin). In contrast, a pectin obtained by treating the HM pectin with acid, alkali, or enzyme so as to decrease DM is referred to as a low methoxyl pectin (LM pectin). LM pectin is known to be gelated by combining with calcium. The DM of LM pectin is 50% or less.

The pectin used in the present invention is preferably a pectin having a DM of 50% or less (i.e., LM pectin), more preferably a pectin having a DM of 20% to 40%.

The weight average molecular weight ($M_w$) of the pectin used in the present invention is preferably 200,000 g/mol or less, more preferably 150,000 g/mol or less.

In the present invention, pectins may be used solely or in a combination of two or more.

In the present invention, two or more kinds of pectin (preferably two or more kinds of LM pectin) may suitably be used together.

In the present invention, when two or more kinds of pectin. (preferably two or more kinds of LM pectin) are used together, the proportion of the pectin having a DM of 20% to 40% and a Mw of 150,000 g/mol or less is preferably 50 mass % or more, more preferably 60 mass % to 98 mass %, and particularly preferably 65 mass % to 95 mass %, based on the total pectin amount (preferably LM pectin) in the concentrated liquid food of the present invention.

A concentrated liquid food containing an excessive amount of a pectin (preferably LM pectin) having a molecular weight of 150,000 g/mol or more tends to have an excessive viscosity before injection into gastric fluid. Further, a concentrated liquid food containing an excessive amount of a LM pectin having a DM of less than 20% has a tendency such that the viscosity before contact with gastric fluid (before injection) becomes excessively high, thereby decreasing the tube fluidity. A concentrated liquid food containing an excessive amount of an LM pectin having a DM of more than 40% has a tendency such that the viscosity after contact with gastric fluid (after injection) does not easily increase.

The content of pectin (preferably LM pectin) based on the total amount of the concentrated liquid food of the present invention is preferably 0.5 mass % to 1.8 mass %, further preferably 0.7 mass % to 1.5 mass %.

In the present invention, when two or more kinds of pectin are used, for example, the concentrated liquid food of the present invention preferably contains (1) a pectin having a weight average molecular weight ($M_w$) of 100,000 g/mol or less, and a degree of methyl esterification (DM) of 40% or less (i.e., Md-pectin), and (2) a pectin having a $M_w$ of 100,000 g/mol or more.

Although pectins usable as food additives obtained from various plants, such as citrus, apple, sugar beet or the like, can be used for the present invention, pectins originated from citrus are preferable. These pectins may be extracted from plants or may be obtained from commercial suppliers. Examples of commercial products include SAN SUPPORT™ P-160, and SAN SUPPORT™ p-161 (product names, both are produced by San-Ei Gen F.F.I., Inc.).

Further, in the present invention, pectin having a weight average molecular weight ($M_w$) of 100,000 g/mol or less, and a degree of methyl esterification (DM) of 40% or less (i.e., Md-pectin) is suitably used as a pectin. This pectin may be, for example, a pectin having a weight average molecular weight ($M_w$) of 100,000 g/mol or less and a degree of methyl esterification (DM) of 40% or less produced by treating a general commercially available pectin, such as SAN SUPPORT™ P-160, SAN SUPPORT™ P-161, or the like (hereinafter referred to as "a pectin material"), with a galacturonic acid hydrolytic enzyme, such as pectinase, and further hydrolyzing the ester bond of the methyl-esterified galacturonic acid using pectin merhylesterase or the like, and prepared by purification (isolation) as necessary. A concentrated liquid food containing Md-pectin has a further preferable property such that the viscosity before contact with simulated gastric fluid further decreases, and separation of gastric fluid and the concentrated liquid food does not occur after the contact with simulated gastric fluid.

A method for producing Md-pectin is shown below.

Step 1. Degradation of Pectin Material into Low-Molecular Pectin $M_w$ of the plant-derived pectin, such as citrus, apple, sugar beet or the like, is 150,000 to 600,000 g/mol. Most commercially available pectin materials have a $M_w$ within this range. The Md-pectin of the present patent is prepared by degrading such a pectin material so that the resulting pectin has a weight average molecular weight ($M_w$) of 100,000 g/mol or less. Degradation of a pectin material into a low molecular pectin is performed by enzymatic degradation. In the enzymatic degradation, an enzyme that hydrolyzes the galacturonic acid sugar chain of the pectin, such as pectinase, is added to a pectin material solution, followed by stirring under controlled temperature and pH, thereby hydrolyzing the sugar chains.

Step 2. Lowering DM (Methyl Esterification of Low-Molecular Pectin)

The DM of the pectin degraded into a low-molecular pectin by the above method depends on the DM of the pectin material. Thus, the DM is high when an HM pectin is used as the material, and low when an LM pectin is used as the raw material. When the DM of the pectin degraded into a low-molecular pectin is more than 40%, it is necessary to hydrolyze the methyl ester bond of the galacturonic acid of the pectin by an acid or alkali treatment or a treatment using a de-esterification enzyme such as pectin methylesterase. To more strictly control the DM of pectin, a method using the enzyme is more preferable.

The molecular weight of Md-pectin must be 100,000 g/mol or less, more preferably 5,000 to 85,000 g/mol, and further preferably 10,000 to 75,000 g/mol.

Further, the DM of Md-pectin must be 40% or less, and more preferably 35% or less.

The content of Md-pectin in the concentrated liquid food of the present invention is preferably 0.1 to 3.0 mass %, more preferably 0.2 to 2.4 mass %, and further preferably 0.6 to 1.8 mass %.

If the content is overly low, the viscosity of the concentrated liquid food of the present invention after contact with gastric fluid is not sufficiently high, and the gastro-esophageal reflux preventing effect may not be sufficient. On the other hand, when the content is excessively high, the viscosity before contact with gastric fluid (upon injection) becomes excessively high, and the tube fluidity may not be sufficient.

The Md-pectin of the present invention is preferably used in a combination with one or more other pectins. The Md-pectin of the present invention may be used in a combination with one or more other pectins or in a combination with one or more other polysaccharides.

The one or more other polysaccharides are, for example, at least one member selected from the group consisting of sodium alginate (including alginic acid material, Md-sodium alginate), carrageenan, gellan gum, soybean polysaccharide, gum arabic, gum ghatti, xanthan gum, guar gum, locust bean gum, glucomannan, psyllium seed gum, and tamarind seed gum.

When the concentrated liquid food of the present invention contains other polysaccharide(s) (i.e., polysaccharide(s) of than pectin), the content of the polysaccharide(s) is 0.1 to 50.0 parts by mass, preferably 0.2 to 25.0 parts by mass, and further preferably 0.25 to 20.0 parts by mass, per part by mass of Md-pectin.

1-2. Alginic Acid or a Salt Thereof

An alginic acid or a salt thereof is a sodium, potassium, calcium, or ammonium salt of a linear acidic polysaccharide constituted of uronic acid, and is a copolymer of α-L-guluronic acid (G) and β-D-mannuronic acid (M). In this specification, the molar content (%) of α-L-guluronic acid relative to the total molar number of α-L-guluronic acid (G) and β-D-mannuronic acid (M) is referred to as a guluronic acid content or G content. More specifically, for example, when it is recited, that "the guluronic acid content is 50% or more" or that "the G content is 50% or more," it means an alginic acid or a salt thereof containing, in a molar content, 50% or more of α-L-guluronic acid (G) and less than 50% of β-D-mannuronic acid (M). G content may be measured by the method disclosed in the Examples of this specification.

The alginic acid or a salt thereof used in the present invention has a G content of preferably 40% to 90%, and more preferably 40% to 85%. Further, the weight average molecular weight (Mw) of alginic acid or a salt thereof is preferably 250,000 g/mol or less, and more preferably 200,000 g/mol or less.

A concentrated liquid food containing an excessive amount of alginic acid or a salt thereof having a $M_w$ of more than 250,000 g/mol tends to have an excessively high viscosity before contact with gastric fluid (upon injection), thereby decreasing the tube fluidity. Further, the viscosity after contact with gastric fluid (after injection) of a concentrated liquid food containing an excessive amount of alginic acid or a salt thereof having a G content of less than 40% is less likely to increase.

The content of the alginic acid or a salt thereof based on the total amount of the concentrated liquid food of the present invention is preferably 0.2 mass % to 1.2 mass %, and further preferably 0.5 mass % to 1.2 mass %.

In the present invention, the alginic acid or salts thereof may be used solely or in a combination of two or more.

In the present invention, two or more kinds of alginic acid or salts thereof may suitably be used.

In the present invention, when two or more kinds of alginic acid or salts thereof are used, the concentrated liquid food of the present invention preferably contains, for example, (1) an alginic acid or a salt thereof having a $M_w$ of 250,000 g/mol or less and a G content of not less than 40% and less than 60%; and (2) an alginic acid or a salt thereof having a $M_w$ of 250,000 g/mol or less and a guluronic acid content of 60% or more.

In the present invention, any alginic acid or a salt thereof usable as a food additive may be used; however, sodium salt is preferable. An alginic acid or a salt thereof can be obtained from commercial suppliers. Examples of commercially available products include SAN SUPPORT™ P-70, P-71, P-72, P-81, and P-82 (product names, San-Ei Sen F.F.I., Inc., all of them are sodium salt).

Further, in the present invention, an alginic acid or a salt thereof having a weight average molecular weight ($M_w$) of 250,000 g/mol or less and a guluronic acid content of 40% to 60% may suitably be used as an alginic acid or a salt thereof. Such an alginic acid or a salt thereof may be, for example, an alginic acid or a salt thereof having a weight average molecular weight (Mw) of 100,000 g/mol or less and a guluronic acid content of 60% or more (Md-alginic acid) produced by hydrolyzing generally commercially available alginic acid and/or sodium salt thereof (hereinafter referred to as "alginic acid material"), such as SAN SUPPORT™-70, P-71, P-72, P-81, or P-82, with an acid or enzyme, followed by precipitation under a specific pH condition, or a treatment to convert mannuronic acid into guluronic acid, and optional purification (isolation). A concentrated liquid food produced by using Md-alginic acid has a further preferable property such that the viscosity before contact with simulated gastric fluid further decreases, and separation of gastric fluid and the concentrated liquid food does not occur after the contact with simulated gastric fluid.

A method for producing Md-sodium alginate is shown below.

Step 1. Degradation of Alginic Acid Material into A Low-Molecular Material

The Mw of an alginic acid material extracted from brown algae is 110,000 to 400,000 g/mol, and the Mw of most commercially available alginic acid materials are also within this range (however, only a few commercially available alginic acids or salts thereof, such as SAN SUPPORT™ P-90, P-91, or the like, have a Mw of 100,000 g/mol or less). The Md-sodium alginate of the present invention is prepared by degrading such an alginic acid material so that the material has a Mw of 100,000 g/mol or less. The degradation of alginic acid into a low-molecular alginic acid is performed by acid hydrolysis or enzymatic degradation. In acid hydrolysis, an alginic acid material is suspended in a hydrochloric acid, sulfuric acid, or like inorganic acid solution diluted with 0.1 to 1.0 M, followed by heating, thereby hydrolyzing the uronic acid sugar chains. In contrast, in enzymatic degradation, an enzyme that hydrolyzes the uronic acid sugar chain of alginic acid, such as alginate lyase, is added to an alginic acid material solution, followed by stirring under controlled temperature and pH, thereby hydrolyzing the uronic acid sugar chains.

Step 2. Preparation of Sodium Alginate Having G Content of 60% or More

The G content of an alginic acid material varies depending on the type of brown algae from which the alginic acid material is extracted, the picking season, and the like; however, most commercially available alginic acid materials have a G content in the range of 40 to 80%. Md-sodium alginate in the present invention has a high G content, i.e., 85% or more. To ensure such a high G content, a selective precipitation method or enzymatic method is used. The selective precipitation method is a method using a difference in solubility depending on the binding form of the guluronic acid and mannuronic acid in the alginic acid sugar chain at a specific pH. In alginic acid, at a pH range of less than 2.5, the region in which guluronic acid and mannuronic acid alternately appear (GM block) has a high solubility, and the region in which guluronic acid is mainly present (G block) and the region in which mannuronic acid is mainly present (M block) have low solubility. Further, at a pH range of not less than 2.5 and less than 3.8, the GM block and M block have high solubility, and the G block has low solubility. Using this nature, by selectively precipitating the G block, and collecting the precipitates, it is possible to increase the G content in the alginic acid sugar chain. The pH during the precipitation of alginic acid must be 3.8 or less, preferably not less than 2.8 and less than 3.8, more preferably not less than 3.0 and less than 3.6. In contrast, in the enzymatic method, an enzyme called C5-epimerase, which converts mannuronic acid into guluronic acid, is used. By adding C5-epimerase to an alginic acid material solution, followed by stirring under a controlled temperature and pH, it is possible to convert the mannuronic acid in the sugar chain into guluronic acid, thus increasing the G content.

The molecular weight of the Md-sodium alginate thus prepared must be 100,000 g/mol or less, more preferably 1,000 to 80,000 g/mol, and further preferably 2,000 to 50,000 g/mol. Further, the G content of the Md-sodium alginate must be 60% or more, more preferably 75% or more, and further preferably 80% or more.

Further, the content of Md-sodium alginate in the concentrated liquid food of the present invention is preferably 0.05 to 3.0 mass %, more preferably 0.1 to 2.5 mass %, and further preferably 0.2 to 1.5 mass %. If the content is overly low, the viscosity of the concentrated liquid food of the present invention after contact with gastric fluid may not become sufficiently high, and the gastro-esophageal reflux preventing effect may not be sufficient; on the other hand, if the content is excessively high, the viscosity before contact with gastric fluid (upon injection) may become excessively high and the tube fluidity may be insufficient.

The Md-sodium alginate used for the present invention must be used in a combination with an alginic acid material; however, the Md-sodium alginate may also be further combined with one or more other polysaccharides.

Examples used for the combination include pectins (including pectin material, Md-pectin), carrageenan, gellan gum, soybean polysaccharide, gum arabic, gum ghatti, xanthan gum, guar gum, locust bean gum, glucomannan, psyllium seed gum, tamarind seed gum, and the like.

When the concentrated liquid food of the present invention contains polysaccharide(s) other than Md-sodium alginate and alginic acid material, the content of the polysaccharide(s) is 0.1 to 50.0 parts by mass, preferably 0.2 to 25.0 parts by mass, and further preferably 0.25 to 20.0 parts by mass, per part by mass of alginic acid or sodium salt thereof.

2. Calcium Source

The "calcium source" used in the present invention may be soluble or insoluble at a pH range of 5.5 to 9.0 before contact with gastric fluid; however, the calcium source must have an ability to generate free calcium ions at a low pH range after contact with gastric fluid. The form of the "calcium source" used in the present invention is not particularly limited insofar as the above conditions are satisfied, for example, the calcium source may be a salt or ion.

In this specification, the "water-soluble calcium source" means a calcium source having a solubility of 0.1 g/100 mL or more at 20.0° C. under a pH of 7.0.

In this specification, the "water-insoluble calcium source" means a calcium source having a solubility of less than 0.1 g/100 mL at 20.0° C. under a pH of 7.0.

More specifically, the "calcium source" may be a "calcium supply source."

In this specification, the "calcium content" designates a value calculated based on only the calcium content in the calcium source this may also be referred to as "the content of calcium source on the calcium basis").

Examples of water-soluble calcium sources include calcium chloride, calcium sulfate, calcium citrate, calcium gluconate, calcium monohydrogen phosphate, and calcium dihydrogen phosphate.

Examples of water-insoluble calcium sources include calcined calcium (sea urchin shell, shell, bone, reef-building coral, lactic, egg shell), uncalcined calcium (shell, bone, coral, nacreous layer, egg shell), calcium carbonate, and calcium trihydrogen phosphate, and hydrates thereof.

In the present invention, the calcium sources may be used solely or in a combination of two or more.

The calcium source used in the present invention may contain a water-soluble calcium source.

The calcium source used in the present invention may essentially consist of a water-soluble calcium source.

The calcium source used in the present invention may consist of a water-soluble calcium source. More specifically, the calcium source used in the present invention may be a water-soluble calcium source.

The calcium source used in the present invention may contain a water-insoluble calcium source.

The calcium source used in the present invention may essentially consist of a water-insoluble calcium source.

The calcium source used in the present invention may consist of a water-insoluble calcium source. More specifically, the calcium source used in the present invention may be a water-insoluble calcium source.

Further, the calcium source may be included in the nutrients described later.

The calcium content in the concentrated liquid food of the present invention can be suitably determined based on the recommended dietary allowance amount, adequate intake, dietary goal, or tolerable intake amount described in the Dietary Reference Intakes for Japanese 2010. However, on the calcium basis, the calcium content is preferably 0.005 mass % to 0.25 mass %, more preferably 0.01 mass % to 0.2 mass %, and further preferably 0.02 mass % to 0.15 mass %.

However, when the calcium content in the concentrated liquid food of the present invention is less than 0.005 mass %, the viscosity of the concentrated liquid food after contact with gastric fluid (after injection) is less likely to increase; on the other hand, when the calcium content is more than 0.25%, the viscosity of the concentrated liquid food of the present invention before contact with gastric fluid (before injection) tends to become excessively high, thereby decreasing the tube fluidity.

3. Chelating Agent

The concentrated liquid food of the present invention may contain a chelating agent.

When the calcium source used in the present invention is soluble in water, the concentrated liquid food of the present invention further contains a chelating agent as an essential ingredient.

When the calcium source used in the present invention contains a calcium source soluble in water, the concentrated liquid food of the present invention preferably further contains a chelating agent.

When the calcium source used in the present invention is insoluble in water, the concentrated liquid food of the present invention may further contain a chelating agent.

Specifically, an embodiment of the concentrated liquid food of the present invention comprises:

(A) a polysaccharide that becomes gelated or thickened by combining with calcium,
(B-1) a water-soluble calcium source,
(C) a chelating agent,
(D) a protein having emulsifiability, and
(E) a soybean hemicellulose.

Further, another embodiment of the concentrated liquid food of the present invention comprises:

(A) a polysaccharide that becomes gelated or thickened by combining with calcium,
(B-2) a water-insoluble calcium source,
(D) a protein having emulsifiability, and
(E) a soybean hemicellulose.

In the present invention, at least one member selected from the group consisting of phosphate, condensed phosphate, malate, succinate, tartarate, glutamate, ethylenediaminetetraacetate, gluconate, citric acid, citrate, phytic acid, and phytate can be used as a chelating agent.

More specifically, it is possible to use at least one member selected from the group consisting of sodium dihydrogen phosphate, disodium hydrogen phosphate, trisodium phosphate, potassium dihydrogen phosphate, dipotassium hydrogen phosphate, tripotassium phosphate, calcium dihydrogen phosphate, dicalcium hydrogen phosphate, tricalcium phosphate, trimagnesium phosphate, tetrasodium pyrophosphate, disodium dihydrogen pyrophosphate, tetrapotassium pyrophosphate, calcium dihydrogen pyrophosphate, sodium polyphosphate, potassium polyphosphate, sodium metaphosphate, potassium metaphosphate, sodium malate, monosodium succinate, disodium succinate, sodium tartrate, potassium bitartrate, sodium glutamate, potassium glutamate, calcium glutamate, magnesium glutamate, calcium disodium ethylenediaminetetraacetate, disodium ethylenediaminetetraacetate, sodium gluconate, potassium gluconate, calcium gluconate, iron gluconate, copper gluconate, trisodium citrate, tripotassium citrate, calcium citrate, iron citrate, and sodium ferric citrate. Of these, for example, citrate is preferable, and at least one member selected from the group consisting of trisodium citrate and tripotassium citrate is more preferable.

The concentrated liquid food of the present invention preferably contains a chelating agent in an amount of 0.05 mass % to 2.0 mass %, more preferably 0.10 mass % to 1.8 mass %, and even more preferably 0.20 mass % to 1.6 mass %.

When the content of the chelating agent in the concentrated liquid food of the present invention is less than 0.05 wt %, the viscosity of the concentrated liquid food of the present invention before contact with gastric fluid (upon injection) becomes excessively high, and the tube fluidity tends to decrease. On the other hand, when the content of the chelating agent is more than 2.0 wt %, the viscosity of the concentrated liquid food of the present invention after contact with gastric fluid (after injection) is less likely to increase.

4. Protein Having Emulsifiability

Unhydrolyzed proteins derived from milk, soybean, and wheat have desirable emulsifiability, and serve to stabilize an emulsified concentrated liquid food. The study of the present invention found that, among these proteins with emulsifiability, unhydrolyzed milk protein has a particularly high effect of stabilizing concentrated liquid foods. In the present invention, an "unhydrolyzed protein" means a protein that was not artificially degraded into a low-molecular protein by a chemical or physical treatment using acid, alkali, enzyme, radial ray, elevated pressure and the like. Degradation of protein into a low-molecular protein means degrading a protein into a protein having a molecular weight of, for example, 5000 Da or less. Therefore, in the present invention, unhydrolyzed proteins encompass proteins in which molecular chains are partially cleaved during food processing steps without an intention of degrading them into a low molecular protein by thermal stirring, homogenization, or the like. The protein having emulsifiability used in the present invention is preferably a protein contained in a dairy product, such as powdered whole milk or powdered skim milk, or an unhydrolyzed milk protein such as whole milk protein, casein or sodium salt thereof, whey protein, lactoglobulin, or lactalbumin, more preferably casein or sodium salt thereof, or whey protein.

The concentrated liquid food of the present invention contains a protein having emulsifiability preferably in an amount of 0.5 mass % to 10.0 mass %, more preferably 1.0 mass % to 8.0 mass %, and further preferably 2.0 mass % to 5.0 mass %.

For example, as a protein source other than protein having emulsifiability, an enzymatically degraded protein product may also be used. However, when a degraded protein product is used, the ratio of the degraded protein product is preferably not more than 5.0 parts by mass, and more preferably not more than 2.0 parts by mass, per part by mass of the unhydrolyzed protein.

Milk proteins, such as whey protein and whole milk protein, often form a salt with calcium. Such calcium can also serve as the calcium of the calcium source as an essential ingredient of the concentrated liquid food of the present invention. More specifically, the milk proteins that form a salt with calcium may be a calcium source as an essential ingredient of the concentrated liquid food of the present invention.

In the present invention, the protein having emulsifiability may be used solely or in a combination of two or more.

5. Water-Soluble Soybean Polysaccharide (Soybean Hemicellulose)

As water-soluble soybean polysaccharide (Soybean Hemicellulose), a water-soluble polysaccharide extracted from water-soluble dietary fibers generated during the production of separated soybean protein may be used. The soybean hemicellulose is presumably constituted of sugars, such as galactose, arabinose, galacturonic acid, rhamnose, xylose, fucose and glucose, and has a structure in which galactan and arabinan are bound to a rhamnogalacturonic acid chain. Since soybean hemicellulose is emulsifiable and also serves to prevent aggregation of protein in the acidic range, soybean hemicellulose is necessary for stable storage of the concentrated liquid food of the present invention. The soybean hemicellulose used in the present invention is not particularly limited insofar as it satisfies the above conditions. Examples of commercially available soybean hemicellulose preparations include "SM-700" and "SM-1200" produced by San-Ei Gen F.F.I., Inc.

In the present invention, soybean hemicellulose may be used solely or in a combination of two or more.

The concentrated liquid food of the present invention contains soybean hemicellulose preferably in an amount of 0.2 mass % to 5.0 mass %, more preferably 0.3 mass % to 3.0 mass %, and further preferably 0.5 mass % to 2.0 mass %. When the content of the soybean hemicellulose is less than 0.2 mass %, aggregation of lipids or proteins in the concentrated liquid food easily occurs. On the other hand, when the content of the soybean hemicellulose is more than 5.0%, the viscosity before contact with gastric fluid (before injection) becomes excessively high, and adverse effects, including a decrease in tube fluidity and a decrease in solubility of pectin, alginic acid or a salt thereof, occur.

6. Other Nutrients

The concentrated liquid food of the present invention preferably has a caloric value of 0.8 kcal/mL or more, and may generally contain at least one nutrient selected from the group consisting of protein ingredients, including the "protein having emulsifiability" described above, lipids, carbohydrates, minerals, vitamins, and the like. The concentrated liquid food of the present invention preferably contains protein ingredients, lipids, carbohydrates, minerals, and vitamins.

The lipids may be general lipids used for food. Specific examples of the lipids include soybean oil, cottonseed oil, safflower oil, one oil, rice oil, coconut Oil, perilla oil, sesame oil, linseed oil, palm oil, rapeseed oil, and like plant oils; sardine oil, cod liver oil, and like fish oils; and long-chain-fatty-acid triglycerides (LCT), medium-chain-fatty-acid triglycerides (MCT), etc., as a source of essential fatty acids. Of these, for example, medium-chain-fatty-acid triglycerides (MCT) having 8 to 10 carbon atoms are generally preferable. The use of medium-chain-fatty-acid triglyceride (MCT) increases lipid adsorption. Concentrated liquid foods containing MCT generally have a high adhesive property, and thus have a tendency such that the amount of residues on the inner wall of the tube used for tube injection increases. However, the concentrated liquid food of the present invention has a low adhesive property even though it contains MCT, and only a small amount of residues is adhered to the inner wall of the tube. The lipid content in the concentrated liquid food of the present invention is preferably 0.5 mass % to 20.0 mass %, and more preferably 1.0 mass % to 15.0 mass %.

The carbohydrates may be general carbohydrates used for food. Examples of the carbohydrates include monosaccharides, such as glucose and fructose; various sugars, such as maltose and sucrose; sugar alcohols, such as xylitol, sorbitol, glycerin, and erythritol; polysaccharides, such as dextrin and cyclodextrin; and oligosaccharides, such as fructooligosaccharide, galactosaccharide, and lactosucrose. Of these, for example, dextrin is preferable because of its low taste impact. The carbohydrate content in the concentrated liquid food of the present invention is preferably 0.5 mass % to 30.0 mass %, and more preferably 1.0 mass % to 20.0 mass %.

Examples of minerals other than calcium include sodium, potassium, magnesium, iron, copper, and zinc. The mineral may be in the form of a salt that is used as a food additive. The mineral content in the concentrated liquid food of the present invention can be suitably determined based on the recommended dietary allowance amount, adequate intake, dietary goal, or tolerable intake level described in the Dietary Reference intakes for Japanese 2010. The usual content determined according to the above are such that the content of sodium can be 600 to 2,000 mg/L; the content of potassium can be 1,000 to 3,500 mg/L; the content of magnesium can be 260 to 650 mg/L; the content of iron can be 10 to 40 mg/L; the content of copper can be 0.8 to 9.0 mg/L; and the content of zinc can be 7 to 30 mg/L.

Examples of vitamins include vitamin A, vitamin B1, vitamin B2, vitamin B6, vitamin B12, vitamin C, vitamin D, vitamin E, vitamin K, niacin, biotin, pantothenic and folic acid. The vitamin content in the concentrated liquid food of the present invention can be suitably determined based on the recommended dietary allowance amount, adequate intake, dietary goal, or tolerable intake level described in the Dietary Reference Intakes for Japanese 2010. The usual content determined according to the above is such that the content of vitamin A can be 540 to 2,000 mg/L; the content of vitamin B1 can be 0.8 to 10.0 mg/L; the content of vitamin B2 can be 1.0 to 100 mg/L; the content of vitamin B6 can be 1.0 to 100 mg/L; the content of vitamin B12 can be 2.4 to 100 mg/L; the content of vitamin C can be 100 to 1,000 mg/L; the content of vitamin D can be 2.5 to 50 µg/L; the content of vitamin E can be 8 to 600 mg/L; the content of vitamin K can be 0.055 to 30 mg/L; the content of niacin can be 13 to 100 mg/L; the content of biotin can be 30 to 100 µg/L; the content of pantothenic acid can be 5 to 100 mg/L; and the content of folic acid can be 200 to 1,000 µg/L.

The concentrated liquid food of the present invention can further contain an additive, etc., usually contained in a concentrated liquid food, insofar as the effects of the present invention are not impaired. For example, the concentrated liquid food of the present invention may contain dietary fiber. The dietary fiber may be a water-soluble dietary fiber or a water-insoluble dietary fiber generally used for food. Examples of water-soluble dietary fibers include pectin, alginic acid or a salt thereof, aqarose, qiucomannan, galactomannan, water-soluble hemicellulose, indigestible dextrin, and indigestible oligosaccharide. Examples of water insoluble dietary fibers include microcrystalline cellulose, fermentation cellulose, lignin, chitin, and chitosan. The polysaccharides that become gelated or thickened by combining with calcium, such as pectin, alginic acid or a salt thereof, and soybean hemicellulose, which is preferable ingredients of the concentrated liquid food of the present invention, may also serve as such a dietary fiber. The dietary fiber content in the concentrated liquid food of the present invention can be suitably determined based on the recommended dietary allowance amount, adequate intake, dietary goal, or tolerable intake level described in the Dietary Reference Intakes for Japanese 2010. The usual fiber content determined according to the above is 20 to 100 g/L.

7. Viscosity (Viscosity Before/After Contact with Gastric Fluid) and Tube Fluidity The viscosity of the concentrated liquid food of the present invention before contact with gastric fluid (upon injection) must be 250 mPa·s or less, preferably 30 to 200 mPa·s, and more preferably 60 to 150 mPa·s or less. Further, the viscosity after contact with gastric fluid must be 1,500 mPa·s or more, and more preferably 2,000 mPa·s or more. The viscosity is measured using a Brookfield rotational viscometer under measurement conditions described later.

Further, before the contact with gastric fluid, the concentrated liquid food of the present invention has a tube fluidity measured by the tube fluidity measurement method detailed below of 300 to 800 mL/hour, and more preferably 400 to 600 mL/hour.

Viscosity Measurement Conditions

The viscosity is measured using a Brookfield rotational viscometer.

Measurement Temperature: 20° C.

Rotation Rate: 6 rpm

The viscosity before contact with gastric fluid is measured by placing 80 g of the concentrated liquid food in a cylindrical glass tube (inner diameter=35 mm, height=100 mm) that can be hermetically-sealed with a cap. Further, the viscosity after contact with gastric fluid is measured by placing 16 g of simulated gastric fluid (an aqueous solution containing 0.7% hydrochloric acid and 0.2% common salt; pH=1.2) in the cylindrical glass tube, adding 64 g of concentrated liquid food, sealing the cylindrical glass tube with a cap, and shaking the glass tube upside-down five times so as to mix the simulated gastric fluid with the concentrated liquid food. The mixture is left to stand at 38° C. for 30 minutes. The temperature is then returned to 20° C., and the viscosity is measured.

The concentrated liquid food of the present invention having such viscosity characteristics can be easily injected, and is sufficiently gelated or thickened when it is injected into the stomach, thereby preventing gastro-esophageal reflux.

Tube Fluidity Measurement Method

Step 1. 100 mL of a sample is placed in a 600-mL plastic bottle with an opening at an upper portion.

Step 2. A flexible silicone tube with an inner diameter of 4 mm (12 Fr) and a length of 1000 mm is connected to the bottom of the plastic bottle.

Step 3. The bottom surface of the plastic bottle is placed 600 mm above the top end of the tube so that the sample flows out only by gravity via the tube.

Step 4. The flow amount A (mL) of the sample that flows out in 2 minutes is measured with a measuring cylinder, and A×30 (ml/hour) is determined to be the tube fluidity of the concentrated liquid food.

8. pH

The pH of the concentrated liquid food of the present invention is generally 4.5 to 9.0, preferably 4.8 to 8.5, and more preferably 5.2 to 8.0.

When the pH is less than 4.5, the viscosity of the concentrated liquid food of the present invention before contact with gastric fluid (upon injection) tends to become excessively high. On the other hand, when the pH is more than 9.0, the taste of the concentrated liquid food may be degraded.

The pH can be adjusted by using, if necessary, a pH adjuster, such as an organic acid and/or a salt thereof, a pH adjuster of an inorganic acid and/or a salt thereof, or the like. Examples of the pH adjuster include organic acids, such as phytic acid, citric acid, lactic acid, gluconic acid, adipic acid, tartaric acid, and malic acid, and salts thereof; sodium carbonate, sodium bicarbonate, sodium hydroxide, etc. Of these, citrate, etc., can also serve as a chelating agent that is an essential ingredient of the concentrated liquid food of the present invention.

9. Production Method

The concentrated liquid food of the present invention can be produced by mixing these ingredients in an arbitrary manner, insofar as the two conditions below are satisfied. The mixing may be performed by using a propeller stirrer; however, it is preferable to homogenize the mixture with a polytron type high-speed mixer or a high-pressure homogenizer after the addition of the lipid so as to stably store the concentrated liquid food.

Condition 1: The polysaccharide that becomes gelated or thickened by combining with calcium and the water-soluble calcium do not coexist in the absence of a chelating agent.

Condition 2: The soybean hemicellulose is added before mixing with the lipid.

More specifically, for example, an aqueous solution or an aqueous dispersion containing calcium, protein having emulsifiability, and nutrients other than lipids (which may contains protein ingredients and/or calcium), and soybean hemicellulose is prepared, and the solution or dispersion is mixed with a polysaccharide that is gelated in the presence of calcium; thereafter, the lipid is added to obtain the concentrated liquid food of the present invention.

The resulting concentrated liquid food of the present invention can be sterilized, if necessary, by ultrahigh-temperature sterilization (UHT) under the conditions of 120° C. to 150° C. for 1 to 5 minutes before or after it is placed in the container.

Specifically, an embodiment of the concentrated liquid food of the present invention may be a concentrated liquid food comprising:

(A) a polysaccharide that becomes gelated or thickened by combining with calcium;

(B-1) a water-soluble calcium;

(C) a chelating agent;

(D) a protein having emulsifiability; and (E) a soybean hemicellulose, and the concentrated liquid food may be produced, for example, by a method comprising the step of mixing:

(A) a polysaccharide that becomes gelated or thickened by combining with calcium;

(B-1) a water-soluble calcium;

(C) a chelating agent;

(D) a protein having emulsifiability; and (E) a soybean hemicellulose.

Further, another embodiment of the concentrated liquid food of the present invention may be a concentrated liquid food comprising:

(A) a polysaccharide that becomes gelated or thickened by combining with calcium;

(B-2) a water-insoluble calcium;

(D) a protein having emulsifiability; and (E) a soybean hemicellulose, and the concentrated liquid food may be produced, for example, by a method comprising the step of mixing:

(A) a polysaccharide that becomes gelated or thickened by combining with calcium;

(B-2) a water-insoluble calcium;

(D) a protein having emulsifiability; and (E) a soybean hemicellulose.

10. Use

The concentrated liquid food of the present invention can be injected as are conventional concentrated liquid foods, by nasogastric or or tube feeding, or gastrostomy or jejunostomy tube feeding.

In particular, since the concentrated liquid food of the present invention has a low viscosity upon injection (until it comes into contact with gastric fluid) and high tube fluidity, it can be injected via a thin nasal-administration tube (5 Fr or less) with a low pressure such as 100 Pa or less, or without applying a pressure, i.e., injected only by gravity (injected by free drip). Thus, the concentrated liquid food of the present invention can be easily injected by nasogastric or oral tube feeding, or gastrostomy or jejunostomy tube feeding in a manner less stressful for the person being fed (the person receiving care). The gastrostomy and intestinal fistula can be created, for example, by percutaneous endoscopic gastrostomy (PEG) and percutaneous endoscopic jejunostomy (PEJ), respectively. Additionally, since the concentrated liquid food of the present invention is thickened (semi-solidified) in the stomach (after it comes into contact with gastric juice), the injection can be performed at a high speed compared with general concentrated liquid food. More specifically, although the injection speed of general liquid food must be adjusted to about 100 to 200 mL/h so as to avoid gastro-esophageal reflux, it is not necessary to adjust the injection speed of the concentrated liquid food of the present invention; the concentrated liquid food of the present invention may be injected at 300 mL/h or more Therefore, by using the concentrated liquid food of the present invention, the caregiver can feed a person (the person receiving care) in a relatively short time without any special instrument, such as a pressure pump. Further, constant attention by the caregiver will not be necessary, thereby reducing the burden and improving the quality of care. In addition, the seating position of the person being fed (the person receiving care) does not need to remain the same for a long period of time during the meal, thereby reducing the burden of the person receiving care because, for example, bedsores can be reduced. Further, since the concentrated liquid food of the present invention is semi-solidified in the stomach, the prevention of diarrhea can also be expected.

The concentrated liquid food of the present invention has high storage stability of dispersibility.

More specifically, in a test using the "method for Evaluating Dispersion Stability after Storage" below, the concentrated liquid food or the present invention is preferably graded as A(Good), more preferably graded as AA (Excellent).

Method for Evaluating Dispersion Stability after Storage

Each concentrated liquid food was stored for two days at 5° C. after preparation, then the liquid food was left to stand in a constant-temperature bath at 20° C. for 30 minutes or more. Thereafter, separation of oil layer or aggregation of proteins was visually confirmed so as to evaluate the dispersion stability after storage. The stability was evaluated at the following four levels.

AA (Excellent) Separation of oil layer or generation of agglomerates was not observed.
A (Good) Separation of oil layer or generation of agglomerates was slightly observed.
B (Normal) Although apparent separation of oil layer or agglomerates was observed, resuspension was possible by mixing.
C (Inferior) Separation of oil layer or agglomerates was observed, and resuspension was not possible by mixing.

Method for Improving Storage Stability of Dispersibility of Concentrated Liquid Food A method for improving the storage stability of the dispersibility of the concentrated liquid food of the present invention comprises incorporating, in the concentrated liquid food,
(A) a polysaccharide that becomes gelated or thickened by combining with calcium;
(B) a calcium source;
optional (C) a chelating agent;
(D) a protein having emulsifiability; and
(E) a soybean hemicellulose (with the proviso that, when the calcium source (B) is a water-soluble calcium source, the concentrated liquid food comprises the chelating agent (C)).

In this method, incorporation of these ingredients in the concentrated liquid food may be achieved by producing the concentrated liquid food using these ingredients, or adding these ingredients to the concentrated liquid food.

The method may be performed, for example, by mixing, upon the production of the concentrated liquid food, (A) a polysaccharide that becomes gelated or thickened by combining with calcium, (B) a calcium, (D) a protein having emulsifiability, and (E) soybean hemicellulose, and, when the (B) calcium is a water-soluble calcium, (C) a chelating agent, together with other materials of the concentrated liquid food.

The details of this method can be understood based on the concentrated liquid food and the production method thereof described above.

EXAMPLES

The present invention is explained below in further detail with reference to Examples. However, the n scope of the invention is not limited to these Examples.

In the Examples below, "mass %" may be abbreviated as "%."

Materials

In the Examples of the present invention, SAN SUPPORT™ P-162, P-163, P-164, P-165, P-166, P-167, P-168, and P-169 (all produced by San-Ei Gen F.F.I., Inc.) were used as pectin.

Further, four kinds of Md-pectins (MDP), i.e., MDP-01, MDP-02, MDP-03, and MDP-04 having a weight average molecular weight (Mw) of 100,000 g/mol or less and a degree of methyl esterification (DM) of 20% to 40% or less, prepared from SAN SUPPORT™-160 and P-161 (both are produced by San-Ei Gen F.F.I., Inc.) were used. As a control, low molecular weight pectins LP-01 and LP-02 having a $M_w$ of 100,000 g/mol or less and a DM of more than 40% were used.

MDP-01

30 g of a pectin material (SAN SUPPORT™ P-160) was dispersed in 970 g of ultra pure water. 1.0 mL (corresponding to 200 U) of a pectinase (product name: Pectinex Yield MASH, produced by Novozyme, diluted 1,000-fold) liquid was added to this dispersion and an enzymatic treatment was performed at 40° C. for 120 minutes; thereafter, the mixture was heated at 90° C. or more for 30 minutes to deactivate the enzyme. 1.0 mL (corresponding to 45 U) of pectin methylesterase (product name: Novo shape XL, produced by Novozyme, diluted 100-fold) was added to this solution, and an enzymatic treatment was performed at 40° C. for 360 minutes; thereafter, the mixture was heated at 90° C. or more for 30 minutes to deactivate the enzyme. By spray-drying this solution, a powdered sample was collected.

MDP-02

30 g of a pectin material (SAN SUPPORT™ P-160) was dispersed in 970 g of ultra pure water. 1.0 mL (corresponding to 200 U) of a pectinase (product name: Pectinex Yield MASH, produced by Novozyme, diluted 1,000-fold with ultra pure water) liquid was added to this dispersion and an enzymatic treatment was performed at 40° C. for 120 minutes; thereafter, the mixture was heated at 90° C. or more for 30 minutes to deactivate the enzyme. 1.0 mL (corresponding to 45 U) of pectin methylesterase (product name: Novo shape XL, produced by Novozyme, diluted 100-fold) was added to this solution, and an enzymatic treatment was performed at 40° C. for 600 minutes; thereafter, the mixture was heated at 90° C. or more for 30 minutes to deactivate the enzyme. By spray-drying this solution, a powdered sample was collected.

MDP-03

30 g of a pectin material (SAN SUPPORT™ P-160) was dispersed in 970 g of ultra pure water. 1.0 mL (corresponding to 200 U) of a pectinase (product name: Pectinex Yield MASH, produced by Novozyme, diluted 1,000-fold with ultra pure water) liquid was added to this dispersion and an enzymatic treatment was performed at 40° C. for 120 minutes; thereafter, the mixture was heated at 90° C. or more for 30 minutes to deactivate the enzyme. 1.0 mL (corresponding to 45 U) of pectin methylesterase (product name: Novo shape XL, produced by Novozyme, diluted 100-fold with ultra pure water) was added to this solution, and an enzymatic treatment was performed at 40° C. for 900 minutes; thereafter, the mixture was heated at 90° C. or more for 30 minutes to deactivate the enzyme. By spray-drying this solution, a powdered sample was collected.

MDP-04

30 g of a pectin material (SAN SUPPORT™ P-161) was dispersed in 970 g of ultra pure water. 1.0 mL (corresponding to 200 U) of a pectinase (product name: Pectinex Yield. MASH, produced by Novozyme, diluted 1,000-fold with ultra pure water) liquid was added to this dispersion and an enzymatic treatment was performed at 40° C. for 30 minutes; thereafter, the mixture was heated at 90° C. or more for 30 minutes to deactivate the enzyme. 1.0 mL (corresponding to 45 U) of pectin methylesterase (product name: Novo shape XL, produced by Novozyme, diluted 100-fold with ultra pure water) was added to this solution, and an enzymatic treatment was performed at 40° C. for 360 minutes; thereafter, the mixture was heated at 90° C. or more for 30 minutes to deactivate the enzyme. By spray-drying this solution, a powdered sample was collected.

LP-01

30 g of a pectin material (SAN SUPPORT™ P-160) was dispersed in 970 g of ultra pure water. 1.0 mL (corresponding to 200 U) of a pectinase (product name: Pectinex Yield MASH, produced by Novozyme, diluted 1,000-fold with ultra pure water) liquid was added to this dispersion and an enzymatic treatment was performed at 40° C. for 120 minutes; thereafter, the mixture was heated at 90° C. or more for 30 minutes to deactivate the enzyme. By spray-drying this solution, a powdered sample was collected.

LP-02

30 g of a pectin material (SAN SUPPORT™ P-160) was dispersed in 970 g of ultra pure water. 1.0 mL (corresponding to 200 U) of a pectinase (product name: Pectinex Yield MASH, produced by Novozyme, diluted 1,000-fold with ultra pure water) liquid was added to this dispersion and an enzymatic treatment was performed at 40° C. for 180 minutes; thereafter, the mixture was heated at 90° C. or more for 30 minutes to deactivate the enzyme. 1.0 mL (corresponding to 45 U) of pectin methyl esterase (product name: Novo shape XL, produced by Novozyme, diluted 100-fold with ultra pure water) was added to this solution, and an enzymatic treatment was performed at 40° C. for 120 minutes; thereafter, the mixture was heated at 90° C. or more for 30 minutes to deactivate the enzyme. By spray-drying this solution, a powdered sample was collected.

Further, as sodium alginate, SAN SUPPORT™ P-70, P-71, P-72, P-73, P-80, P-81, P-82, P-83, and P-90 (all produced by San-Ei Gen F.F.I., Inc.) were used.

Further, four kinds of Md-sodium alginate (MDA), i.e., MDA-01, MDA-02, MDA-03, and MDA-04 having a weight average molecular weight ($M_w$) of 100,000 g/mol or less and a guluronic acid content of 70% or more were prepared as follows by using SAN SUPPORT™ P-80 and P-71 (San-Ei Gen F.F.I., Inc.) as alginic acid materials for preparing Md-alginic acid. Further, as a control, low molecular weight sodium alginates LA-01 and LA-02 having a Mw of 100,000 g/mol or less and a G content of less than 85% were prepared.

MDA-01

20 p of an alginic acid material (SAN SUPPORT™ P-80) was suspended in 200 mL of 0.3 M hydrochloric followed by stirring at 25° C. for 17 hours. The supernatant was decanted off, and 50 mL of 0.3 M hydrochloric acid was added, followed by heating at 95° C. for 2 hours. The suspension was centrifuged for 15 minutes at 750×g. After the supernatant was discarded, the residue was suspended in 50 mL of ultra pure water. This operation was repeated twice. The precipitates were suspended in 50 mL of ultra pure water, and the pH was adjusted to 3.5 using 0.5 M NaOH, followed by stirring for 17 hours at 25° C. The suspension was centrifuged for 15 minutes at 750×g, and the supernatant was discarded. After the precipitates were suspended in 100 mL of ultra pure water, the pH was adjusted to 7.0 using 4.0 M NaOH and the precipitates were dissolved. This solution was filtered with a GF/A glass filter (pore diameter: 1.6 µm), and a powdered sample was collected by freeze-drying.

MDA-02

80 g of an alginic acid material (SAN SUPPORT™ P-80) was suspended in 800 mL of 0.3 M hydrochloric acid, followed by stirring at 25° C. for 17 hours. The supernatant was decanted off, and 200 mL of 0.3 M hydrochloric acid was added, followed by heating at 95° C. for 6 hours. The suspension was centrifuged for 15 minutes at 750×g. After the supernatant was discarded, the residue was suspended in 600 mL of ultra pure water. This operation was repeated twice. The precipitates were suspended in 600 mL of ultra pure water, and the pH was adjusted to 3.5 using 0.5 M NaOH, followed by stirring for 17 hours at 25° C. The suspension was centrifuged for 15 minutes at 750×g, and the supernatant was discarded. After the precipitates were suspended in 600 mL of ultra pure water, the pH was adjusted to 7.0 using 4.0 M NaOH and the precipitates were dissolved. This solution was filtered with a GF/A glass filter (pore diameter: 1.6 µm), and a powdered sample was collected by freeze-drying.

MDA-03

6 g of an alginic acid material (SAN SUPPORT™ P-80) was dispersed in 194 p of phosphate buffer (200 mM) having a pH of 6.5. 216 U of an alginate lyase (product name: alginate lyase 5, produced by Nagase Enzymes) liquid was added to this dispersion, and an enzymatic treatment was performed for 30 minutes at 40° C.; thereafter, 2.0 mL of 1.0 M sodium hydroxide was added to deactivate the enzyme. The pH of this solution was adjusted to 3.5 using 0.1 M hydrochloric acid, followed by stirring for 17 hours at 25° C. The suspension was centrifuged for 15 minutes at 750×g, and the supernatant was discarded. After the precipitates were suspended in 100 mL of ultra pure water, the pH Was adjusted to 7.0 using 4.0 M NaOH and the precipitates were dissolved. This solution was filtered with a GF/A glass filter (pore diameter: 1.6 µm), and a powdered sample was collected by freeze-drying.

MDA-04

6 g of an alginic acid material (SAN SUPPORT™ P-80) was dispersed in 194 g or phosphate buffer (200 mM) having a pH of 6.5. 216 U of an alginate lyase (product name: alginate lyase 5, produced by Nagase Enzymes) liquid was added to this dispersion, and an enzymatic treatment was performed for 60 minutes at 40° C.; thereafter, 2.0 mL of 1.0 M sodium hydroxide was added to deactivate the enzyme. The pH of this solution was adjusted to 3.5 using 0.1 M hydrochloric acid, followed by stirring for 17 hours at 25° C. The suspension was centrifuged for 15 minutes at 750×g, and the supernatant was discarded. After the precipitates were suspended in 100 mL of ultra pure water, the pH was adjusted to 7.0 using 4.0 M NaOH and the precipitates were dissolved. This solution was filtered with a GF/A glass filter (pore diameter: 1.6 μm), and a powdered sample was collected by freeze-drying.

LA-01

20 g of an alginic acid material (SAN SUPPORT™ P-80) was suspended in 150 mL of 0.3 M hydrochloric acid, followed by stirring at 25° C. for 17 hours. The supernatant was decanted off, and 50 mL of 0.3 M hydrochloric acid was added, followed by heating at 95° C. for 2 hours. The suspension was centrifuged for 15 minutes at 750×g. After the supernatant was discarded, the residue was suspended in 50 mL of ultra pure water. This operation was repeated twice. The resultant precipitate was suspended in 200 mL of ultra pure water and the pH was adjusted to 4.0 using 0.5 M sodium hydroxide, followed by stirring for 17 hours at 25° C. The suspension was centrifuged for 15 minutes at 750×g, and only the supernatant was collected. The pH was adjusted to 2.6 using 0.5 M hydrochloric acid. The suspension was centrifuged for 15 minutes at 750×g. After the supernatant was discarded, the residue was suspended in 100 mL of ultra pure water. Thereafter, pH was adjusted to 7.0 using 4.0 M NaOH and the precipitates were dissolved. This solution was filtered with a GF/A glass filter (pore diameter: 1.6 μm), and a powdered sample was collected by freeze-drying.

LA-02

20 g of an alginic acid material (SAN SUPPORT™ P-71) was suspended in 150 mL of 0.3 M hydrochloric acid, followed by stirring at 25° C. for 17 hours. The supernatant was decanted off, and 50 mL of 0.3 M hydrochloric acid was added, followed by heating at 95° C. for 2 hours. The suspension was centrifuged for 15 minutes at 750×g. After the supernatant was discarded, the residue was suspended in 50 mL of ultra pure water. This operation was repeated twice. The resultant precipitate was suspended in 200 mL of ultra pure water and the pH was adjusted to 4.0 using 0.5 M sodium hydroxide, followed by stirring for 17 hours at 25° C. The suspension was centrifuged for 15 minutes at 750×g, and only the supernatant was collected. The pH was adjusted to 2.6 using 0.5 M hydrochloric acid. The suspension was centrifuged for 15 minutes at 750×g. After the supernatant was discarded, the residue was suspended in 100 mL of ultra pure water. Thereafter, pH was adjusted to 7.0 using 4.0 M NaOH and the precipitates were dissolved. This solution was filtered with a GF/A glass filter (pore diameter: 1.6 μm), and a powdered sample was collected by freeze-drying.

Measurement of Properties of Materials

The degree of methyl esterification (DM) and weight average molecular weight ($M_w$) were measured with respect to the above pectins, and the guluronic acid content (G content) and $M_w$ were measured with respect to the above sodium alginates. Tables 1 and 2 show the results.

(1) Method for Measuring Methyl Esterification Degree (DM) of Pectin 0.1 g of pectin was dispersed in 9.9 g of ultra pure water while stirring with a magnetic stirrer. 0.675 mL of this dispersion was measured, and 0.075 mL of 100 mM sulfuric acid copper solution was added to the dispersion, followed by stirring and mixing. 0.75 mL of 1.0 M sodium hydroxide was added and mixed, and the mixture was left to stand for 1.5 hours at 4° C. The resulting liquid was centrifuged for 12 minutes at 10,000×g, and the supernatant was adjusted in pH to 7.5 using 1.0 M hydrochloric acid, and adjusted to 2.0 mL. 0.5 mL (corresponding to 12.5 U) of alcohol oxidase (EC 1.1.3.13, Sigma-Aldrich) was added and stirred, and the mixture was left to stand at 25° C. for at least an hour; thereafter, 2.5 mL of 2,4-pentanedione reagent (Sigma-Aldrich) was added and stirred. The resulting mixture was left to stand for 30 minutes at 40° C., and further left to stand for 30 minutes at 25° C. The quantitative determination or methanol was performed at 412 nm absorbency. The DM (%) is determined by the formula below.

$$DM(\%) = (\text{molar number of methanol/molar number of galacturonic acid}) \times 100$$

(2) Method for Measuring Guluronic Acid Content (G Content) of Sodium Alginate

The G content of sodium alginate was determined by dividing the peak area from 5.00 to 5.15 ppm derived from the proton bonded to the carbon at the 1-position of the guluronic acid by the sum of the peak area from 5.00 to 5.15 ppm and the peak area from 4.60 to 4.75 ppm derived from the proton bonded to the carbon at the 1-position of the mannuronic acid. These peak areas were observed in measurement by $^1$H-NMR. G content (%) is determined by the formula below.

$$G \text{ content } (\%) = \text{guluronic acid-derived peak area/} \\ (\text{guluronic acid-derived peak area+mannuronic acid-derived peak area}) \times 100$$

The method for preparing samples and the $^1$H-NMR measurement method are described below. Sodium alginate was dissolved in deuterium oxide and then freeze-dried. This operation was repeated three times, and exchangeable protons were removed, followed by drying under reduced pressure for 24 hours. Each of the samples obtained by drying under reduced pressure was dissolved in deuterium oxide so as to have a content of about 2 mass %, and sodium trimethylsilylpropionate (TSP) was added as an internal standard. The $^1$H-NMR measurement was performed with an ECA600 NMR measurement apparatus (JEOL Ltd.) under the following conditions.

$^1$H-NMR Measurement Conditions

Magnetic Field Strength: 14.096 T
Frequency: 600 MHz
Pulse Angle: 45°
Pulse Time: 6.75 microseconds
Relaxation Time: 5 seconds
Number of Scans: 128
Measurement Temperature: 70° C.

(3) Method for Measuring Weight Average Molecular Weight ($M_w$) (Common Method for Pectin and Sodium Alginate)

The $M_w$ of pectin and sodium alginate was determined by separating a diluted sample solution by size separation chromatography and measuring the weight average molecular weight with a multi-angle light scattering detector and a refractive index detector by the following method.

$M_w$ Measurement Method 1.5 g of pectin or sodium alginate on a dry weight basis was added to 100 g of ion-exchanged water, and the mixture was stirred with a Polytron type mixer at a rotation speed of 26,000 rpm for 1 minute to disperse pectin or sodium alginate, thereby preparing a 1.5 mass % dispersion. The dispersion was diluted 30-fold with 0.5 M $NaNO_3$ aqueous solution and stirred with a Polytron type mixer (Silent Crusher M; Heidolph) at a rotation speed of 26,000 rpm for 1 minute to prepare a 0.05 mass % dispersion. The obtained dispersion was filtered through a PTFE membrane filter with a pore size of 0.45 μm to remove insoluble matter, followed by gel filtration chromatography under the following conditions. The weight average molecular weight ($M_w$(g/mol)) was then calculated using analysis software (ASTRA Version 4.9, Wyatt Technology Corporation) from measurement values obtained by using a multi-angle light scattering detector (DAWN-EOS, Wyatt Technology Corporation) and a refractive index detector (RI-101, Showa Denko K.K.).
Gel Filtration Chromatography Measurement Conditions
Column: OHpak SB-806 M HQ (Showa Denko K.K.)
Column temperature: 25° C.
Flow Rate: 0.5 mL/min
Eluent: 0.5 M $NaNO_3$
Amount of Sample Liquid: 100 μL Generally, pectins having a DM of less than 50% are classified as "LM pectin," and pectins having a DM of 50% or more are classified as "HM pectin." In the present invention, LM pectins are further classified as follows.
Pectins having a DM of 40% to 50%: LHM pectin
Pectins having a DM of 20% to 40%: LMM pectin
Pectins having a DM of 20% or less: LLM pectin The pectins pectins are further classified as follows based on the measured values of weight average molecular weight ($M_w$).
Pectins having a $M_w$ of 150,000 g/mol or less: $LM_w$ pectin
Pectins having a $M_w$ of 150,000 to 200,000 g/mol: $MM_w$ pectin
Pectins having a $M_w$ of 200,000 g/mol or more: $HM_w$ pectin According to the above classification, the various SAN SUPPORT preparations containing pectins used in the present Examples can be classified as shown in Table 1. In the tables below, for example, "LHM pectin," "$LM_w$ pectin," and the like may be simply referred to as "LHM," "$LM_w$," and the like.

Further, in addition to the above classification, pectins having a $M_w$ of 100,000 g/mol or less and a DM of 40% or less are classified as MDP, and pectins having a $M_w$ of 100,000 g/mol or less and a DM of more than 40% are classified as LP.

TABLE 1

|  | DM (%) | $M_w$ (g/mol) | Classification |
|---|---|---|---|
| SAN SUPPORT ™ P-160 | 72.3 | 2.05 × 10⁵ | LHM, $LM_w$ |
| SAN SUPPORT ™ P-161 | 35.2 | 1.58 × 10⁵ | LMM, $HM_w$ |
| SAN SUPPORT ™ P-162 | 42.0 | 1.40 × 10⁵ | LHM, $LM_w$ |
| SAN SUPPORT ™ P-163 | 35.2 | 2.02 × 10⁵ | LMM, $HM_w$ |
| SAN SUPPORT ™ P-164 | 28.7 | 1.09 × 10⁵ | LMM, $LM_w$ |
| SAN SUPPORT ™ P-165 | 20.5 | 1.79 × 10⁵ | LMM, $MM_w$ |
| SAN SUPPORT ™ P-166 | 15.2 | 1.47 × 10⁵ | LLM, $LM_w$ |
| SAN SUPPORT ™ P-167 | 74.2 | 1.35 × 10⁵ | HM, $LM_w$ |
| SAN SUPPORT ™ P-168 | 60.5 | 1.95 × 10⁵ | HM, $MM_w$ |
| SAN SUPPORT ™ P-169 | 52.4 | 4.96 × 10⁵ | HM, $HM_w$ |
| MDP-01 | 35.6 | 6.77 × 10⁴ | MDP |
| MDP-02 | 10.4 | 6.85 × 10⁴ | MDP |
| MDP-03 | 5.2 | 6.62 × 10⁴ | MDP |
| MDP-04 | 15.5 | 3.55 × 10⁴ | MDP |
| LP-01 | 70.6 | 6.50 × 10⁴ | LP |
| LP-02 | 50.2 | 5.06 × 10⁴ | LP |

As in the classification of pectins, sodium alginates used in the present invention are classified as follows based on the G content.
Sodium alginates having a G content of 40% or less: LG sodium alginate
Sodium alginates having a G content of 40% to 60%: MG sodium alginate
Sodium alginates having a G content of 60% or more: HG sodium alginate
Sodium alginates having a $M_w$ of 200,000 g/mol or less: $LM_w$ sodium alginate
Sodium alginates having a $M_w$ of 200,000 to 250,000 g/mol: $MM_w$ sodium alginate
Sodium alginates having a $M_w$ of 250,000 g/mol or more: $HM_w$ sodium alginate According to the above classification, the various SAN SUPPORT preparations containing sodium alginates used in the present Examples can be classified as shown in Table 2. In the tables below, for example, "LG sodium alginate," "$LM_w$ sodium alginate," and the like may simply be referred to as "LG," "$LM_w$," and the like.

Further, in addition to the above classification, sodium alginates having a $M_w$ of 100,000 g/mol or less and a guluronic acid content of 60% or more are classified as MDA, and sodium alginates having a $M_w$ of 100,000 g/mol or less and a guluronic acid content of less than 60% are classified as LA.

TABLE 2

|  | G Content (%) | $M_w$ (g/mol) | Classification |
|---|---|---|---|
| SAN SUPPORT ™ P-70 | 45.5 | 1.75 × 10⁵ | MG, $LM_w$ |
| SAN SUPPORT ™ P-71 | 50.9 | 2.03 × 10⁵ | MG, $MM_w$ |
| SAN SUPPORT ™ P-72 | 57.4 | 2.92 × 10⁵ | MG, $HM_w$ |
| SAN SUPPORT ™ P-73 | 52.5 | 3.56 × 10⁵ | MG, $HM_w$ |
| SAN SUPPORT ™ P-80 | 74.5 | 1.11 × 10⁵ | HG, $LM_w$ |
| SAN SUPPORT ™ P-81 | 70.1 | 1.87 × 10⁵ | HG, $LM_w$ |
| SAN SUPPORT ™ P-82 | 64.9 | 2.37 × 10⁵ | HG, $MM_w$ |
| SAN SUPPORT ™ P-83 | 35.5 | 1.26 × 10⁵ | LG, $LM_w$ |
| SAN SUPPORT ™ P-90 | 65.9 | 3.19 × 10 | MDA |
| MDA-01 | 94.0 | 2.21 × 10⁴ | MDA |
| MDA-02 | 86.7 | 1.49 × 10⁴ | MDA |
| MDA-03 | 90.2 | 4.85 × 10⁴ | MDA |
| MDA-04 | 91.6 | 1.65 × 10⁴ | MDA |
| LA-01 | 56.7 | 7.75 × 10³ | LA |
| LA-02 | 48.5 | 5.00 × 10⁴ | LA |

Test Example 1

Method 1

Concentrated liquid foods were prepared according to method (1-1) below. Further, the viscosity of each concentrated liquid food before and after contact with simulated gastric fluid was evaluated according to method (1-2) below, and tube fluidity was evaluated according to method (1-3) below.

(1-1) Preparation of Concentrated Liquid Food
Solution A-1

80.0 g of sodium caseinate was added to 540.0 g of ion-exchanged water, and the mixture was stirred with a propeller stirrer for 10 minutes at normal temperature. After this dispersion was heated to 80° C., 4.6 g of calcium chloride (dihydrate), 5.0 g of potassium chloride (anhydrous), 16.0 g of trisodium citrate, 40.0 g of soybean hemicellulose (SM-1200, San-Ei Gen F.F.I., Inc.), 100.0 g of dextrin, and 140.0 g of caster sugar were added and dispersed by mixing for 10 minutes at 80° C. with a propeller stirrer. The total amount of each dispersion was adjusted to 930.0 g with ion-exchanged water, and the dispersion was left to stand for at least 30 minutes in a constant-temperature water bath maintained at 20° C.; thereafter, 70 g of medium-chain fatty acid triglyceride (MCT, Nisshin OilliO Group Ltd.) was added and mixed for 5 minutes at normal temperature with a propeller stirrer, followed by a single homogenization at 14.7 MPa, thereby preparing solution A-1.

Solutions B-1 to 3

The pectins (SAN SUPPORT™ P-164, both produced by San-Ei Gen F.F.I., Inc.), the sodium alginates (SAN SUPPORT™ P-70, P-80, both produced by San-Ei Gen F.F.I., Inc.), or guar gum (VIS TOP™ San-Ei Gen F.F.I., Inc.) in the amounts specified in Table 3 was added to 90.0 g of ion-exchanged water heated to 80° C., and dispersed by mixing for 10 minutes at 80° C. with a propeller stirrer. The total amount of each dispersion was adjusted to 100.0 g with ion-exchanged water, thereby preparing solutions B-1 to B-3.

TABLE 3

| | Addition Amount (g) | | | | |
|---|---|---|---|---|---|
| | Pectin | | Sodium Alginate | | |
| | SAN SUPPORT P-163 | SAN SUPPORT P-164 | SAN SUPPORT P-70 | SAN SUPPORT P-80 | Guar Gum VIS TOP D-2029 |
| Solution B-1 | 0.5 | 4.0 | — | — | — |
| Solution B-2 | — | — | 2.0 | 1.0 | — |
| Solution B-3 | — | — | — | — | 1.5 |

Examples 1 and 2 and Comparative Examples 1 and 2

Solution A-1 and solutions B-1 to B-3 were mixed at the proportions shown in Table 4, thereby preparing concentrated liquid foods of Examples 1 and 2 and Comparative Examples 1 and 2. These concentrated liquid foods had a pH of 6.6 to 7.0.

TABLE 4

| | Addition Amount (g) | | | | |
|---|---|---|---|---|---|
| | Solution A-1 | Solution B-1 | Solution B-2 | Solution B-3 | Ion-Exchanged Water |
| Example 1 | 50.0 | 24.0 | — | — | 26.0 |
| Example 2 | 50.0 | — | 18.0 | — | 32.0 |
| Comparative Example 1 | 50.0 | — | — | — | 50.0 |
| Comparative Example 2 | 50.0 | — | — | 20.0 | 30.0 |

(1-2) Viscosity Evaluation Method

Viscosity Measurement

The measurement of the viscosity before contact with gastric fluid is performed by placing 80.0 g of the concentrated liquid food in a cylindrical glass tube (inner diameter=35 mm, height=100 mm) that can be hermetically sealed with a cap. Further, the viscosity after contact with gastric fluid is measured by placing 16 g of simulated gastric fluid an aqueous solution containing 0.7 hydrochloric acid and 0.2% common salt; ph=1.2) in the cylindrical glass tube, adding 64.0 g of concentrated liquid food, sealing the cylindrical glass tube with a cap, and shaking the glass tube upside-down five times so as to mix the simulated gastric fluid with the concentrated liquid food. The mixture is left unattended at 38'C for 30 minutes. Thereafter, after the temperature is returned to 20° C., the viscosity is measured.

Viscosity Measurement Conditions

The viscosity was measured using a Brookfield rotational viscometer (BL II viscometer, Tokyo Keiki Inc.).

Measurement Temperature: 20° C.

Rotation Rate: 6 rpm (1-3) Tube Fluidity Evaluation Method 100 ml of concentrated liquid food was placed in a 600-mL plastic bottle with an opening at an upper portion. A flexible silicone tube with an inner diameter of 4 mm and a length of 1000 mm was connected to the bottom of the plastic bottle. The bottom surface of the plastic bottle was placed 600 mm above the top end of the tube so that the sample flowed out only by gravity via the tube. The flow amount A (mL) of the sample that flowed out in 2 minutes was measured with a measuring cylinder, and A×30 (mL/hour) was determined to be the tube fluidity of the concentrated liquid food.

Results 1

Table 5 shows the viscosity of the concentrated liquid food before and after the contact with simulated gastric fluid, ratios of these viscosities (viscosity increasing rate), and the tube fluidity. In the tables below, "Na alginate" means "sodium alginate."

TABLE 5

| Concentrated Liquid Food (Polysaccharide (Concentration)) | Viscosity before contact (mPa · s) | Viscosity after contact (mPa · s) | Viscosity Increasing Rate (Times) | Tube Fluidity (mL/h) |
|---|---|---|---|---|
| Example 1 (Pectin 1.08%) | 158 | 3480 | 22.0 | 444 |
| Example 2 (Sodium Alginate 0.54%) | 184 | 3690 | 20.1 | 465 |
| Comparative Example 1 (Blank) | 15 | 12 | 0.8 | 3450 |
| Comparative Example 2 (Guar Gum 0.30%) | 82 | 75 | 0.9 | 915 |

The viscosities before contact with simulated gastric fluid of the concentrated liquid foods of Examples 1 and 2 containing a sodium alginate or a pectin, which is a polysaccharide that becomes gelated or thickened by combining with calcium, were both 250 mPa·s or less; and further, their tube fluidities were 300 mL/h or more. Further, their viscosities after contact with simulated gastric fluid were both 1,500 mPa·s or more. The results suggested that the concentrated liquid foods of the present invention have a sufficiently low viscosity before contact with gastric fluid (upon injection), and thus have high fluidity, and that the concentrated liquid foods of the present invention are thickened in the stomach (after injection), thereby preventing gastro-esophageal reflux.

It was also suggested that, in contrast, in Comparative Example 1, which did not use a polysaccharide other than soybean polysaccharide, and Comparative Example 2 using guar gum, which is a polysaccharide that is not gelated by combining with calcium, although the viscosities before contact with simulated gastric fluid were 250 mPa·s or less, the viscosities after contact with simulated gastric fluid were even lower, and that, therefore, the gastro-esophageal reflux preventing effect cannot be expected from these concentrated liquid foods.

Test Example 2

Method 2

Concentrated liquid foods were prepared according to method (2-1) below. Further, the viscosities of the concentrated liquid foods before and after contact with simulated gastric fluid were evaluated according to method (1-2) above.

(2-1) Preparation of Concentrated Liquid Food

Solution A-1

Solution A-1 was prepared in the same manner as that for preparing Solution. A-1 in (1-1) above.

Solutions B-4 to B-11

Pectins (SAN SUPPORT™ P-162, P-163, P-164, P-165, P-166, P-167, P-168, P-169, all produced by San-Ei Gen F.F.I., Inc.) in the amounts specified in Table 6 were added to 90.0 g of ion-exchanged water heated to 80° C., and dispersed by mixing for 10 minutes at 80° C. using a propeller stirrer. The total amount of each dispersion was adjusted to 100.0 g with ion-exchanged water, thereby preparing solutions B-4 to B-11.

TABLE 6

| | Addition Amount (g) SAN SUPPORT | | | | | | | |
|---|---|---|---|---|---|---|---|---|
| | P-162 LHM, $LM_w$ | P-163 LMM, $HM_w$ | P-164 LMM, $LM_w$ | P-165 LMM, $MM_w$ | P-166 LLM, $LM_w$ | P-167 HM, $LM_w$ | P-168 HM, $MM_w$ | P-169 HM, $HM_w$ |
| Solution B-4 | 4.5 | — | — | — | — | — | — | — |
| Solution B-5 | — | 4.5 | — | — | — | — | — | — |
| Solution B-6 | — | — | 4.5 | — | — | — | — | — |
| Solution B-7 | — | — | — | 4.5 | — | — | — | — |
| Solution B-8 | — | — | — | — | 4.5 | — | — | — |
| Solution B-9 | — | — | — | — | — | 4.5 | — | — |
| Solution B-10 | — | — | — | — | — | — | 4.5 | — |
| Solution B-11 | — | — | — | — | — | — | — | 4.5 |

Examples 3 to 17 and Comparative Examples 3 to 7

Solution A-1 and solutions B-4 to B-11 were mixed at the proportions specified in Table 7 to prepare concentrated liquid foods of Examples 3 to 17 and Comparative Examples 3 to 7. These concentrated liquid foods had a pH of 6.0 to 6.5.

TABLE 7

| | Content (g) | | | | | | | | | Ion-Exchanged Water |
|---|---|---|---|---|---|---|---|---|---|---|
| | Solution | | | | | | | | | |
| | A-1 | B-4 | B-5 | B-6 | B-7 | B-8 | B-9 | B-10 | B-11 | |
| Example 3 | 50.0 | 24.0 | — | — | — | — | — | — | — | 26.0 |
| Example 4 | 50.0 | — | 24.0 | — | — | — | — | — | — | 26.0 |
| Example 5 | 50.0 | — | — | 24.0 | — | — | — | — | — | 26.0 |
| Example 6 | 50.0 | — | — | — | 24.0 | — | — | — | — | 26.0 |
| Example 7 | 50.0 | — | — | — | — | 24.0 | — | — | — | 26.0 |
| Example 8 | 50.0 | — | — | 12.0 | — | — | — | — | — | 38.0 |
| Example 9 | 50.0 | — | — | 32.0 | — | — | — | — | — | 18.0 |
| Example 10 | 50.0 | — | 3.0 | 21.0 | — | — | — | — | — | 26.0 |
| Example 11 | 50.0 | — | 6.0 | 18.0 | — | — | — | — | — | 26.0 |
| Example 12 | 50.0 | — | 12.0 | 12.0 | — | — | — | — | — | 26.0 |
| Example 13 | 50.0 | — | 18.0 | 6.0 | — | — | — | — | — | 26.0 |
| Example 14 | 50.0 | — | — | 21.0 | 3.0 | — | — | — | — | 26.0 |
| Example 15 | 50.0 | — | — | 18.0 | 6.0 | — | — | — | — | 26.0 |
| Example 16 | 50.0 | — | — | 12.0 | 12.0 | — | — | — | — | 26.0 |
| Example 17 | 50.0 | — | — | 6.0 | 18.0 | — | — | — | — | 26.0 |
| Comparative Example 3 | 50.0 | — | — | — | — | 24.0 | — | — | — | 26.0 |
| Comparative Example 4 | 50.0 | — | — | — | — | — | 24.0 | — | — | 26.0 |
| Comparative Example 5 | 50.0 | — | — | — | — | — | — | 24.0 | — | 26.0 |
| Comparative Example 6 | 50.0 | — | — | 6.0 | — | — | — | — | — | 44.0 |
| Comparative Example 7 | 50.0 | — | — | 48.0 | — | — | — | — | — | 2.0 |

Results 2

Table 8 shows the viscosities of the concentrated liquid foods before and after contact with simulated gastric fluid, and ratios of these viscosities (viscosity increasing rate).

TABLE 8

| Concentrated Liquid Food (Polysaccharide (Concentration)) | Viscosity before contact (mPa · s) | Viscosity after contact (mPa · s) | Viscosity Increasing Rate (Times) |
|---|---|---|---|
| Example 3 (LHM, $LM_w$ 1.08%) | 138 | 1600 | 11.6 |
| Example 4 (LMM, $HM_w$ 1.08%) | 180 | 2160 | 12.0 |
| Example 5 (LMM, $LM_w$ 1.08%) | 172 | 3055 | 17.8 |
| Example 6 (LMM, $MM_w$ 1.08%) | 195 | 1860 | 9.5 |
| Example 7 (LLM, $LM_w$ 1.08%) | 248 | 1680 | 6.8 |
| Example 8 (LMM, $LM_w$ 0.54%) | 89 | 1510 | 17.0 |
| Example 9 (LMM, $LM_w$ 1.44%) | 235 | 3670 | 15.6 |
| Example 10 (LMM, $HM_w$ 0.14%; LMM, $LM_w$ 0.95%) | 155 | 3520 | 22.7 |
| Example 11 (LMM, $HM_w$ 0.27%; LMM, $LM_w$ 0.81%) | 165 | 3070 | 18.6 |
| Example 12 (LMM, $HM_w$ 0.54%; LMM, $LM_w$ 0.54%) | 180 | 2460 | 13.7 |
| Example 13 (LMM, $HM_w$ 0.81%; LMM, $LM_w$ 0.27%) | 175 | 2250 | 12.9 |
| Example 14 (LMM, $MM_w$ 0.14%; LMM, $LM_w$ 0.95%) | 182 | 2560 | 14.1 |
| Example 15 (LMM, $MM_w$ 0.27%; LMM, $LM_w$ 0.81%) | 195 | 2120 | 10.9 |
| Example 16 (LMM, $MM_w$ 0.54%; LMM, $LM_w$ 0.54%) | 211 | 1880 | 8.9 |
| Example 17 (LMM, $MM_w$ 0.81%; LMM, $LM_w$ 0.27%) | 200 | 1750 | 8.8 |
| Comparative Example 3 (HM, $LM_w$ 1.08%) | 115 | 95 | 0.8 |
| Comparative Example 4 (HM, $MM_w$ 1.08%) | 155 | 116 | 0.7 |
| Comparative Example 5 (HM, $HM_w$ 1.08%) | 95 | 88 | 0.9 |
| Comparative Example 6 (LMM, $LM_w$ 0.27%) | 38 | 38 | 1.0 |
| Comparative Example 7 (LMM, $LM_w$ 2.16%) | 850 | 7856 | 9.2 |

In the concentrated liquid foods of Examples 3 to 9 containing 0.54% to 1.44% of a single kind of LM pectin having a DM of less than 50%, all of their before contact with simulated gastric fluid were 250 mPa·s or less, and all viscosities after contact with simulated gastric fluid were 1,500 mPa·s or more. The results suggested that the concentrated liquid foods of the present invention have a sufficiently low viscosity before contact with gastric fluid (upon injection), and thus have high fluidity, and that the concentrated liquid foods of the present invention are thickened in the stomach (after injection), thereby preventing gastro-esophageal reflux.

Comparing the concentrated liquid foods of Examples 3 to 7, the viscosities of the concentrated liquid foods of Examples 4 to 6 containing LMM pectin having a DM of 20% to 40% tend to increase after contact with simulated gastric fluid.

The viscosity increasing rate was the highest in the concentrated liquid food of Example 5 containing a pectin (SAN SUPPORT™ P-164) having a molecular weight of 150,000 g/mol or less ($LM_w$) and a DM of 20% to 40% ($MM_w$). It was thus suggested that this concentrated liquid food was comprehensively superior. Further, Examples 8 and 9 containing SAN SUPPORT™ P-164 at different concentrations also have a tendency of a high viscosity increasing rate. Further, the concentrated liquid foods of Examples 10 to 17 containing 2 kinds of LM pectins including SAN SUPPORT™ P-164, all of their viscosities before contact with simulated gastric fluid were 250 mPa·s or less, and all viscosities after contact with simulated gastric fluid were 1,500 mPa·s or more. The viscosity increasing rate was the highest in the concentrated liquid food of Example 10 containing SAN SUPPORT™ P-164 (LMM, $LM_w$) in an amount of 0.95% (88% of the total pectin) relative to the concentrated liquid food, and SAN SUPPORT™ P-163 (LMM, $HM_w$) in an amount of 0.14% (12% of the total pectin) relative to the concentrated liquid food. It was thus suggested that this concentrated liquid food was comprehensively superior.

In contrast, the viscosity increasing rates of the concentrated liquid foods of Examples 12, 13, 16 and 17 containing SAN SUPPORT™ or P-165 (LMM, $MM_w$) in an amount of 50% or more relative to the total pectin (i.e., the content of SAN SUPPORT™ P-164 relative to the total pectin is less than 50%) were lower than that of Example 5 containing only SAN SUPPORT™ P-164.

In contrast, in Comparative Examples 3 to 5 containing HM pectin having a DM of 50% or more and Comparative Example 6 containing LM pectin but its content is 0.27%, although the viscosities before contact with simulated gastric fluid were 250 mPa·s or less, the viscosities did not sufficiently increase after contact with simulated gastric fluid. It was thus suggested that the gastro-esophageal reflux preventing effect after contact with gastric fluid (after injection) cannot be expected from these Comparative Examples. Further, the viscosity before contact with simulated gastric fluid of Comparative Example 7 containing 2.16% of LM pectin was more than 250 mPa·s. It was thus suggested that this concentrated liquid food has insufficient fluidity before contact with gastric fluid (upon injection).

Test Example 3

Method 3

Concentrated liquid foods were prepared according to method (3-1) below. Further, the viscosities of the concentrated liquid foods before and after contact with simulated gastric fluid were evaluated according to method (1-2) above.

(3-1) Preparation of Concentrated Liquid Food

Solution A-1

Solution A-1 was prepared in the same manner as that for preparing Solution A-1 in (1-1) above.

Solutions B-12 to B-19

Sodium alginates (SAN SUPPORT™ P-70, P-71, P-72, P-73, P-80, P-81, P-82, P-83, all produced by San-Ei Gen F.F.I., Inc.) in the amounts specified in Table 9 were mixed with 90.0 g of ion-exchanged water heated to 80° C., and dispersed by mixing for 10 minutes at 80° C. using a propeller stirrer. The total amount of each dispersion was adjusted to 100.0 g with ion-exchanged water, thereby preparing solutions B-12 to B-19.

TABLE 9

| | Addition Amount (g) SAN SUPPORT | | | | | | | |
|---|---|---|---|---|---|---|---|---|
| | P-70 MG, $LM_w$ | P-71 MG, $MM_w$ | P-72 MG, $HM_w$ | P-73 MG, $HM_w$ | P-80 HG, $LM_w$ | P-81 HG, $LM_w$ | P-82 HG, $MM_w$ | P-83 LG, $LM_w$ |
| Solution B-12 | 3.0 | — | — | — | — | — | — | — |
| Solution B-13 | — | 3.0 | — | — | — | — | — | — |
| Solution B-14 | — | — | 3.0 | — | — | — | — | — |
| Solution B-15 | — | — | — | 3.0 | — | — | — | — |
| Solution B-16 | — | — | — | — | 3.0 | — | — | — |
| Solution B-17 | — | — | — | — | — | 3.0 | — | — |
| Solution B-18 | — | — | — | — | — | — | 3.0 | — |
| Solution B-19 | — | — | — | — | — | — | — | 3.0 |

Examples 18 to 33 and Comparative Examples 8 and 9

Solution A-1 and solutions B-12 to B-19 were mixed at the proportions specified in Table 10 to prepare concentrated liquid foods of Examples 16 to 33 and Comparative Examples 8 and 9. These concentrated liquid foods had a pH of 6.2 to 6.8.

TABLE 10

| | Content (g) | | | | | | | | | Ion-Exchanged Water |
|---|---|---|---|---|---|---|---|---|---|---|
| | Solution | | | | | | | | | |
| | A-1 | B-12 | B-13 | B-14 | B-15 | B-16 | B-17 | B-18 | B-19 | |
| Example 18 | 50.0 | 24.0 | — | — | — | — | — | — | — | 26.0 |
| Example 19 | 50.0 | — | 18.0 | — | — | — | — | — | — | 32.0 |
| Example 20 | 50.0 | — | — | 12.0 | — | — | — | — | — | 38.0 |
| Example 21 | 50.0 | — | — | — | 12.0 | — | — | — | — | 38.0 |
| Example 22 | 50.0 | — | — | — | — | 24.0 | — | — | — | 26.0 |
| Example 23 | 50.0 | — | — | — | — | — | 18.0 | — | — | 32.0 |
| Example 24 | 50.0 | — | — | — | — | — | — | 12.0 | — | 38.0 |
| Example 25 | 50.0 | — | — | — | — | — | — | — | 32.0 | 18.0 |
| Example 26 | 50.0 | 16.0 | — | — | — | 8.0 | — | — | — | 26.0 |
| Example 27 | 50.0 | 12.0 | — | — | — | 12.0 | — | — | — | 26.0 |
| Example 28 | 50.0 | 8.0 | — | — | — | 16.0 | — | — | — | 26.0 |
| Example 29 | 50.0 | — | 12.0 | — | — | — | — | 6.0 | — | 32.0 |
| Example 30 | 50.0 | — | 9.0 | — | — | — | — | 9.0 | — | 32.0 |
| Example 31 | 50.0 | — | 6.0 | — | — | — | — | 12.0 | — | 32.0 |
| Example 32 | 50.0 | 24.0 | — | — | — | 12.0 | — | — | — | 14.0 |
| Example 33 | 50.0 | 3.0 | — | — | — | — | — | 6.0 | — | 41.0 |
| Comparative Example 8 | 50.0 | 6.0 | — | — | — | — | — | — | — | 44.0 |
| Comparative Example 9 | 50.0 | 48.0 | — | — | — | — | — | — | — | 2.0 |

Results 3

Table 11 shows the viscosities of the concentrated liquid foods before and after contact with simulated gastric fluid, and ratios of these viscosities (viscosity increasing rate).

TABLE 11

| Concentrated Liquid Food (Polysaccharide (Concentration)) | Viscosity before contact (mPa·s) | Viscosity after contact (mPa·s) | Viscosity Increasing Rate (Times) |
|---|---|---|---|
| Example 18 (MG, $LM_w$ 0.72%) | 125 | 1920 | 15.4 |
| Example 19 (MG, $MM_w$ 0.54%) | 168 | 2170 | 12.9 |
| Example 20 (MG, $HM_w$ 0.36%) | 180 | 1880 | 10.4 |
| Example 21 (MG, $HM_w$ 0.36%) | 214 | 1535 | 7.2 |
| Example 22 (HG, $LM_w$ 0.72%) | 162 | 1975 | 12.2 |
| Example 23 (HG, $LM_w$ 0.54%) | 130 | 1750 | 13.5 |
| Example 24 (HG, $MM_w$ 0.36%) | 131 | 1655 | 12.6 |
| Example 25 (LG, $LM_w$ 0.96%) | 202 | 1510 | 7.5 |
| Example 26 (MG, $LM_w$ 0.48%; HG, $LM_w$ 0.24%) | 135 | 3580 | 26.5 |
| Example 27 (MG, $LM_w$ 0.36%; HG, $LM_w$ 0.36%) | 152 | 3160 | 20.8 |
| Example 28 (MG, $LM_w$ 0.24%; HG, $LM_w$ 0.48%) | 174 | 3840 | 22.1 |
| Example 29 (MG, $MM_w$ 0.36%; HG, $MM_w$ 0.18%) | 121 | 2880 | 23.8 |
| Example 30 (MG, $MM_w$ 0.27%; HG, $MM_w$ 0.27%) | 148 | 2770 | 18.7 |
| Example 31 (MG, $MM_w$ 0.18%; HG, $MM_w$ 0.36%) | 176 | 2550 | 14.5 |

TABLE 11-continued

| Concentrated Liquid Food (Polysaccharide (Concentration)) | Viscosity before contact (mPa·s) | Viscosity after contact (mPa·s) | Viscosity Increasing Rate (Times) |
|---|---|---|---|
| Example 32 (MG, $LM_w$ 0.72%; HG, $LM_w$ 0.36%) | 225 | 4560 | 20.3 |
| Example 33 (MG, $MM_w$ 0.09%; HG, $MM_w$ 0.18%) | 85 | 2050 | 24.1 |
| Comparative Example 8 (MG, $LM_w$ 0.18%) | 26 | 25 | 1.0 |
| Comparative Example 9 (MG, $LM_w$ 1.44%) | 950 | 9200 | 9.7 |

In the concentrated liquid foods of Examples 18 to 25 containing 0.36% to 0.96% of a single kind of sodium alginate, all of their viscosities before contact with simulated gastric fluid were 250 mPa·s or less, and all viscosities after contact with simulated gastric fluid were 1,500 mPa·s or more. The results suggested that the concentrated liquid foods of the present invention have a sufficiently low viscosity before contact with gastric fluid (upon injection), and thus have high fluidity, and that the concentrated liquid foods of the present invention are thickened in the stomach (after injection), thereby preventing gastro-esophageal reflux.

Comparing the concentrated liquid foods of Examples 18 to 25, there was a tendency for liquid foods containing sodium alginate having a relatively low molecular weight ($LM_w$, $MM_w$), i.e., 250,000 g/mol or less, to have high viscosity increasing rates in Examples other than Example 25 using sodium alginate having a G content of less than 40%. Among Examples 26 to 33 using sodium alginate (MG) having a G content of 401 to 60% and sodium alginate (HG) having a G content of 60% or more, the viscosity increasing rates were higher than those of the concentrated liquid foods (Examples 18 to 25) containing only a single kind of sodium alginate, except for Example 31. It was thus suggested that it is possible to improve the viscosity increasing rate by incorporating a proper balance of MG and HG of sodium alginate.

In contrast, for Comparative Example 8 containing 0.18% of sodium alginate, although the viscosity before contact with simulated gastric fluid was 250 mPa·s or less, the viscosity did not sufficiently increase after contact with simulated gastric fluid. It was thus suggested that the gastro-esophageal reflux preventing effect cannot be expected from this Comparative Example. Further, the viscosity before contact with simulated gastric fluid of Comparative Example 9 containing 1.44% of sodium alginate was more than 250 mPa·s. It was thus suggested that this concentrated liquid food has insufficient fluidity before contact with gastric fluid (upon injection).

Test Example 4

Method 4

Concentrated liquid foods were prepared according to method (4-1) below. Further, the viscosities of the concentrated liquid foods before and after contact with simulated gastric fluid were evaluated according to method (1-2) above. Further, according to method (4-2) below, the stabilities of the concentrated liquid foods (dispersion stability after storage) were evaluated after the concentrated liquid foods were left to stand for two days at 5° C.

(4-1) Preparation of Concentrated Liquid Food Solutions A-2 to A-7

40.0 g of sodium caseinate was added to 600.0 g of ion-exchanged water, and the mixture was stirred for 10 minutes at normal temperature with a propeller stirrer. After this dispersion was heated to 80° C., 4.6 g of calcium chloride (dihydrate), 5.0 g of potassium chloride (anhydrous), 16.0 g of trisodium citrate, 100.0 g of dextrin, 140.0 g of caster sugar, and soybean hemicellulose (SM-1200, San-Ei Gen F.F.I., Inc.), gum ghatti (Gum Ghatti SD, San-Ei Gen F.F.I., Inc.), or gum arabic (Gum Arabic SD, San-Ei Gen F.F.I., Inc.) in the amounts specified in Table 12 were added and dispersed by mixing for 10 minutes at 80° C. using a propeller stirrer. The total amount of each dispersion was adjusted to 1000.0 g with ion-exchanged water, and the dispersion was left to stand for at least 30 minutes in a constant-temperature water bath at 20° C., thereby preparing Solutions A-2 to A-7.

TABLE 12

| | Addition Amount (g) | | |
|---|---|---|---|
| | Soybean hemicellulose SM-1200 | Gum Ghatti Gum Ghatti SD | Gum Arabic Gum Arabic SD |
| Solution A-2 | 10.0 | — | — |
| Solution A-3 | 20.0 | — | — |
| Solution A-4 | 40.0 | — | — |
| Solution A-5 | — | 5.0 | — |
| Solution A-6 | — | — | 40.0 |
| Solution A-7 | — | — | — |

Solutions B-20 and B-21

Pectin (SAN SUPPORT™ P-163, P-164, both produced by San-Ei Gen F.F.I., Inc.) or sodium alginate (SAN SUPPORT™ P-71, P-80, all produced by San-Ei Gen F.F.I., Inc.) in the amount specified in Table 13 was added to 90.0 g of ion-exchanged water heated to 80° C., and dispersed by mixing for 10 minutes at 80° C. using a propeller stirrer. The total amount of each dispersion was adjusted to 100.0 g with ion-exchanged water, thereby preparing solutions B-20 and B-21.

TABLE 13

| | Addition Amount (g) SAN SUPPORT | | | |
|---|---|---|---|---|
| | Pectin | | Sodium Alginate | |
| | P-163 | P-164 | P-71 | P-80 |
| Solution B-20 | 0.67 | 5.33 | — | — |
| Solution B-21 | — | — | 0.60 | 2.40 |

Examples 34 to 39 and Comparative Examples 10 to 15

Solutions A-2 to A-7 and solutions B-20 and B-21 were mixed at the proportions shown in Table 14, and stirred with a Polytron type mixer (Silent Crusher M; Heidolph) for 30 seconds at a rotation speed of 26,000 rpm. Thereafter, 3.5 g of medium-chain fatty acid triglyceride (MCT, Nisshin OilliO Group Ltd.) was added and further stirred at a rotation speed of 26,000 rpm for a minute to prepare concentrated liquid foods of Examples 34 to 39 and Comparative Examples 10 to 15. These concentrated liquid foods had a pH of 6.2 to 7.0.

TABLE 14

| | Content (g) | | | | | | | | | |
|---|---|---|---|---|---|---|---|---|---|---|
| | Solution | | | | | | | | Ion-Exchanged | |
| | A-2 | A-3 | A-4 | A-5 | A-6 | A-7 | B-20 | B-21 | Water | MCT |
| Example 34 | 50.0 | — | — | — | — | — | 16.0 | — | 30.5 | 3.5 |
| Example 35 | — | 50.0 | — | — | — | — | 16.0 | — | 30.5 | 3.5 |
| Example 36 | — | — | 50.0 | — | — | — | 16.0 | — | 30.5 | 3.5 |
| Example 37 | 50.0 | — | — | — | — | — | — | 18.0 | 28.5 | 3.5 |
| Example 38 | — | 50.0 | — | — | — | — | — | 18.0 | 28.5 | 3.5 |
| Example 39 | — | — | 50.0 | — | — | — | — | 18.0 | 28.5 | 3.5 |
| Comparative Example 10 | — | — | — | 50.0 | — | — | 16.0 | — | 30.5 | 3.5 |
| Comparative Example 11 | — | — | — | — | 50.0 | — | 16.0 | — | 30.5 | 3.5 |
| Comparative Example 12 | — | — | — | — | — | 50.0 | 16.0 | — | 30.5 | 3.5 |
| Comparative Example 13 | — | — | — | 50.0 | — | — | — | 18.0 | 28.5 | 3.5 |
| Comparative Example 14 | — | — | — | — | 50.0 | — | — | 18.0 | 28.5 | 3.5 |
| Comparative Example 15 | — | — | — | — | — | 50.0 | — | 18.0 | 28.5 | 3.5 |

(4-2) Evaluation of Dispersion Stability After Storage

After being stored for two days at 5° C. after the preparation, each concentrated liquid food was left to stand in a constant-temperature bath at 20° C. for at least 30 minutes. Separation of oil layer and aggregation of proteins were visually confirmed, and the dispersion stability after storage was evaluated. The stability was evaluated at the following four levels.

AA (Excellent) Separation of oil layer or generation of agglomerates was not observed.

A (Good) Separation of oil layer or generation of agglomerates was slightly observed.

B (Normal) Although apparent separation of oil layer or agglomerates were observed, resuspension was possible by mixing.

(Inferior) Separation of oil layer or agglomerates were observed, and resuspension was not possible by mixing.

Results 4

Table 15 shows the viscosities of the concentrated liquid foods before and after contact with simulated gastric fluid, ratios of these viscosities (viscosity increasing rate), and dispersion stabilities after storage after the concentrated liquid foods were left to stand for 2 days at 5° C.

TABLE 15

| Concentrated Liquid Food (Polysaccharide (Concentration)) | Viscosity before Contact (mPa·s) | Viscosity after Contact (mPa·s) | Viscosity Increasing Rate (Times) | Dispersion Stability after Storage |
|---|---|---|---|---|
| Example 34 (Pectin 0.96%; Soybean hemicellulose 0.5%) | 79 | 1800 | 22.8 | AA |
| Example 35 (Pectin 0.96%; Soybean hemicellulose 1.0%) | 67 | 2760 | 41.2 | AA |
| Example 36 (Pectin 0.96%; Soybean hemicellulose 2.0%) | 202 | 4320 | 21.4 | AA |
| Example 37 (Sodium Alginate 0.54%; Soybean hemicellulose 0.5%) | 97 | 2410 | 24.9 | A |
| Example 38 (Sodium Alginate 0.54%; Soybean hemicellulose 1.0%) | 102 | 1560 | 15.3 | AA |
| Example 39 (Sodium Alginate 0.54%; Soybean hemicellulose 2.0%) | 113 | 2600 | 23.0 | AA |
| Comparative Example 10 (Pectin 0.96%; Gum Ghatti 0.25%) | 60 | 5300 | 88.3 | B |
| Comparative Example 11 (Pectin 0.96%; Gum Arabic 2.0%) | 85 | 6400 | 75.3 | C |
| Comparative Example 12 (Pectin 0.96%; Blank) | 1550 | 2050 | 1.3 | C |
| Comparative Example 13 (Sodium Alginate 0.54%; Gum Ghatti 0.25%) | 35 | 3200 | 91.4 | C |
| Comparative Example 14 (Sodium Alginate 0.54%; Gum Arabic 2.0%) | 63 | 5700 | 90.5 | C |
| Comparative Example 15 (Sodium Alginate 0.54%; Blank) | 120 | 4400 | 36.7 | C |

For the concentrated liquid foods of Examples 34 to 39 containing 0.5% to 2.0% of soybean hemicellulose, all of their viscosities before contact with simulated gastric fluid were 250 mPa·s or less, and all viscosities after contact with simulated gastric fluid were 1,500 mPa·s or more. Further, after the concentrated liquid foods were left to stand for 2 days at 5° C., separation of oil layer, aggregation of proteins and the like were hardly observed; these concentrated liquid foods were thus in good condition. The liquid foods using pectin as a polysaccharide that becomes gelated or thickened by combining with calcium, and liquid foods using sodium alginate as a polysaccharide that becomes gelated or thickened by combining with calcium had similar stabilities. The results suggested that the concentrated liquid foods of the present invention have a sufficiently low viscosity before contact with gastric fluid (upon injection), and thus have high fluidity, that the concentrated liquid foods of the present invention are thickened in the stomach (after injection), thereby preventing gastro-esophageal reflux, and that the concentrated liquid foods of the present invention ensure desirable dispersion stability after storage. In contrast, in the concentrated liquid foods of Comparative Examples 10 and 13 containing gum ghatti instead of soybean hemicellulose, the concentrated liquid foods of Comparative Examples 11 and 14 containing gum arabic, and the concentrated liquid food of Comparative Example 15 that did not contain polysaccharides other than sodium alginate, although all of their viscosities before contact with simulated gastric fluid were 250 mPa·s or less and all viscosities after contact with simulated gastric fluid were 1,500 mPa·s or more, after the concentrated liquid foods were left to stand for 2 days at 5° C., apparent separation of oil layer and agglomerates were observed. The generated agglomerates could not be resuspended even after intense shaking in the concentrated liquid foods other than Comparative Example 10 using pectin as a polysaccharide that becomes gelated or thickened by combining with calcium, and gum ghatti. The viscosity before contact with simulated gastric fluid of the concentrated liquid food of Comparative Example 12 that does not contain polysaccharides other than pectin was higher than 250 mPa·s. It was thus suggested that this concentrated liquid food has insufficient fluidity before contact with gastric fluid (upon injection). The results revealed that soybean hemicellulose is necessary to ensure stable storage of the concentrated liquid foods of the present invention.

Test Example 5

Method 5

Concentrated liquid foods were prepared according to method (5-1) below. Further, the viscosities of the concentrated liquid foods before and after contact with simulated gastric fluid were evaluated according to method (1-2) above. Further, according to method (4-2) above, the stabilities after storage of the concentrated liquid foods were evaluated after the concentrated liquid foods were left to stand for 2 days at 5° C.

(5-1) Preparation of Concentrated Liquid Food

Solutions A-8 to A-15

40.0 of sodium caseinate was added to 600.0 g of ion-exchanged water, and the mixture was stirred for 10 minutes at normal temperature with a propeller stirrer. After this dispersion was heated to 80° C., 5.0 g of potassium chloride (anhydrous), 100.0 g of dextrin, 140.0 g of caster sugar, 40.0 g of soybean hemicellulose (SM-1200, San-Ei Gen F.F.I., Inc.), and calcium chloride dihydrate and trisodium citrate in the amounts specified in Table 16 were added and dispersed by mixing for 10 minutes at 80° C. using a propeller stirrer. The total amount of each dispersion was adjusted to 1000.0 g with ion-exchanged water, and the dispersion was left to stand for at least 30 minutes in a constant-temperature water bath at 20° C., thereby preparing Solutions A-8 to A-15.

TABLE 16

| | Addition Amount (g) | |
|---|---|---|
| | Calcium Chloride | Trisodium Citrate |
| Solution A-8 | 0.9 | 4.0 |
| Solution A-9 | 2.3 | 8.0 |
| Solution A-10 | 4.6 | 16.0 |
| Solution A-11 | 6.9 | 24.0 |
| Solution A-12 | 9.2 | 32.0 |
| Solution A-13 | — | — |
| Solution A-14 | — | 16.0 |
| Solution A-15 | 4.6 | — |

Solutions B-20 and B-21

Solutions B-20 and B-21 were prepared in the same manner as that for preparing Solutions B-20 and B-21 in (4-1) above.

Examples 40 to 49 and Comparative Examples 16 to 21

Solutions A-8 to A-15 and solutions B-20 and B-21 were mixed at the proportions shown in Table 17, and stirred with a Polytron type mixer (Silent Crusher M; Heidolph) at a rotation speed of 26,000 rpm for 30 seconds. Thereafter, 3.5 g of medium-chain fatty acid triglyceride (MCT, Nisshin OilliO Group Ltd.) was added and further stirred at a rotation speed of 26,000 rpm for 1 minute to prepare concentrated liquid foods of Examples 40 to 49 and Comparative Examples 16 to 21. These concentrated liquid foods had a pH of 6.2 to 7.0.

TABLE 17

| | Content (g) | | | | | | | | | | Ion-Exchanged Water | MCT |
|---|---|---|---|---|---|---|---|---|---|---|---|---|
| | Solution | | | | | | | | | | | |
| | A-8 | A-9 | A-10 | A-11 | A-12 | A-13 | A-14 | A-15 | B-20 | B-21 | | |
| Example 40 | 50.0 | — | — | — | — | — | — | — | 16.0 | — | 30.5 | 3.5 |
| Example 41 | — | 50.0 | — | — | — | — | — | — | 16.0 | — | 30.5 | 3.5 |
| Example 42 | — | — | 50.0 | — | — | — | — | — | 16.0 | — | 30.5 | 3.5 |
| Example 43 | — | — | — | 50.0 | — | — | — | — | 16.0 | — | 30.5 | 3.5 |
| Example 44 | — | — | — | — | 50.0 | — | — | — | 16.0 | — | 30.5 | 3.5 |
| Example 45 | 50.0 | — | — | — | — | — | — | — | — | 18.0 | 28.5 | 3.5 |
| Example 46 | — | 50.0 | — | — | — | — | — | — | — | 18.0 | 28.5 | 3.5 |
| Example 47 | — | — | 50.0 | — | — | — | — | — | — | 18.0 | 28.5 | 3.5 |
| Example 48 | — | — | — | 50.0 | — | — | — | — | — | 18.0 | 28.5 | 3.5 |
| Example 49 | — | — | — | — | 50.0 | — | — | — | — | 18.0 | 28.5 | 3.5 |
| Comparative Example 16 | — | — | — | — | — | 50.0 | — | — | 16.0 | — | 30.5 | 3.5 |

TABLE 17-continued

| | Content (g) | | | | | | | | | | | |
|---|---|---|---|---|---|---|---|---|---|---|---|---|
| | Solution | | | | | | | | | | Ion-Exchanged Water | MCT |
| | A-8 | A-9 | A-10 | A-11 | A-12 | A-13 | A-14 | A-15 | B-20 | B-21 | | |
| Comparative Example 17 | — | — | — | — | — | — | 50.0 | — | 16.0 | — | 30.5 | 3.5 |
| Comparative Example 18 | | | | | | | — | 50.0 | 16.0 | — | 30.5 | 3.5 |
| Comparative Example 19 | | | | 50.0 | | | — | — | — | 18.0 | 28.5 | 3.5 |
| Comparative Example 20 | | | | | | 50.0 | — | — | — | 18.0 | 28.5 | 3.5 |
| Comparative Example 21 | | | | | | | 50.0 | — | — | 18.0 | 28.5 | 3.5 |

Results 5

Table 18 shows the viscosities of the concentrated liquid foods before and after contact with simulated gastric fluid, ratios of these viscosities (viscosity increasing rate), and stabilities after the concentrated liquid foods were left to stand for 2 days at 5° C. In the tables below, "$CaCl_2$" designates "calcium chloride", and "citric acid 3Na" designates "trisodium citrate".

TABLE 18

| Concentrated Liquid Food (Concentrations of Polysaccharide, Calcium, Chelating agent) Calcium Concentration was calculated from $CaCl_2$(Dihydrate) | Viscosity before Contact (mPa · s) | Viscosity after Contact (mPa · s) | Viscosity Increasing Rate (Times) | Dispersion Stability after Storage |
|---|---|---|---|---|
| Example 40 (Pectin 0.96%, Calcium 0.012%, Trisodium Citrate 0.20%) | 88 | 1680 | 19.1 | AA |
| Example 41 (Pectin 0.96%, Calcium 0.031%, Trisodium Citrate 0.40%) | 105 | 3050 | 29.0 | AA |
| Example 42 (Pectin 0.96%, Calcium 0.062%, Trisodium Citrate 0.80%) | 131 | 6600 | 50.4 | AA |
| Example 43 (Pectin 0.96%, Calcium 0.094%, Trisodium Citrate 1.20%) | 165 | 5480 | 33.2 | AA |
| Example 44 (Pectin 0.96%, Calcium 0.125%, Trisodium Citrate 1.60%) | 222 | 6850 | 30.9 | AA |
| Example 45 (Sodium Alginate 0.54%, Calcium 0.012%, Trisodium Citrate 0.20%) | 85 | 3040 | 35.8 | AA |
| Example 46 (Sodium Alginate 0.54%, Calcium 0.032%, Trisodium Citrate 0.40%) | 90 | 5500 | 61.1 | AA |
| Example 47 (Sodium Alginate 0.54%, Calcium 0.062%, Trisodium Citrate 0.80%) | 136 | 5250 | 38.6 | AA |
| Example 48 (Sodium Alginate 0.54%, Calcium 0.094%, Trisodium Citrate 1.20%) | 98 | 5350 | 54.6 | AA |
| Example 49 (Sodium Alginate 0.54%, Calcium 0.125%, Trisodium Citrate 1.60%) | 155 | 3620 | 23.4 | AA |
| Comparative Example 16 (Pectin 0.96%, Calcium 0%, Trisodium Citrate 0%) | 98 | 77 | 0.8 | AA |
| Comparative Example 17 (Pectin 0.96%, Calcium 0%, Trisodium Citrate 0.8%) | 54 | 21 | 0.4 | AA |
| Comparative Example 18 (Pectin 0.96%, Calcium 0.064%, Trisodium Citrate 0%) | 2380 | 1070 | 0.4 | AA |

TABLE 18-continued

| Concentrated Liquid Food (Concentrations of Polysaccharide, Calcium, Chelating agent) Calcium Concentration was calculated from CaCl$_2$(Dihydrate) | Viscosity before Contact (mPa · s) | Viscosity after Contact (mPa · s) | Viscosity Increasing Rate (Times) | Dispersion Stability after Storage |
|---|---|---|---|---|
| Comparative Example 19 (Sodium Alginate 0.54%, Calcium 0%, Trisodium Citrate 0%) | 80 | 65 | 0.8 | A |
| Comparative Example 20 (Sodium Alginate 0.54%, Calcium 0%, Trisodium Citrate 0.8%) | 224 | 47 | 0.2 | B |
| Comparative Example 21 (Sodium Alginate 0.54%, Calcium 0.064%, Trisodium Citrate 0%) | 8240 | 3420 | 0.4 | AA |

In all of the concentrated liquid foods of Examples 40 to 49 containing 0.012% to 0.125% of a water-soluble calcium chloride-derived calcium and 0.2% to 1.60% of trisodium citrate as a chelating agent, the viscosities before contact with simulated gastric fluid (before injection) were 250 mPa·s or less, and the viscosities after contact with simulated gastric fluid (after injection) were 1,500 mPa·s or more. Further, after the concentrated liquid foods were left to stand for 2 days at 5° C., separation of oil layer, aggregation proteins, and the like were hardly observed; the concentrated liquid foods were thus in a good condition. The concentrated liquid foods using pectin as a polysaccharide that becomes gelated or thickened by combining with calcium, and concentrated liquid foods using sodium alginate as a polysaccharide that becomes gelated or thickened by combining with calcium had similar stabilities. The results suggested that the concentrated liquid foods of the present invention have a sufficiently low viscosity before contact with gastric fluid (upon injection) and thus have high fluidity, that the concentrated liquid foods of the present invention are thickened in the stomach (after injection), thereby preventing gastro-esophageal reflux, and that the concentrated liquid foods of the present invention had desirable dispersion stabilities. In contrast, in the concentrated liquid foods of Comparative Examples 16 and 19 that contain neither calcium chloride-derived calcium nor trisodium citrate, and the concentrated liquid foods of Comparative Examples 17 and 20 that contain trisodium citrate but do not contain calcium chloride-derived calcium, although the viscosities before contact with simulated gastric fluid were 250 mPa·s or less, the viscosities were not increased after contact with simulated gastric fluid. The viscosities before contact with simulated gastric fluid of the concentrated liquid foods of Comparative Examples 18 and 21 that contain calcium but do not contain trisodium citrate were higher than 250 mPa·s, suggesting that the fluidities before contact with gastric fluid (upon injection) of these concentrated liquid foods are insufficient. These results revealed that a water-soluble calcium source-derived calcium and a chelating agent are necessary to ensure that the concentrated liquid food of the present invention has a sufficiently low viscosity before contact with gastric fluid (upon injection) and high fluidity, and is thickened after contact with gastric fluid (after injection) to prevent gastro-esophageal reflux.

Test Example 6

Method 6

Concentrated liquid foods were prepared according to method (6-1) below. Further, the viscosities of the concentrated liquid foods before and after contact with simulated gastric fluid were evaluated according to method (1-2) above. Further, according to method (4-2) above, the stabilities of the concentrated liquid foods were evaluated after the concentrated liquid foods were left to stand for two days at 5° C.

(6-1) Preparation of Concentrated Liquid Food
Solutions A-16 to 19

Sodium caseinate or soybean peptide (HINUTE-AM Fuji Oil Co., Ltd.), calcium chloride (dihydrate), and trisodium citrate in the amounts specified in Table 19 were added to 600.0 g of ion-exchanged water, and the mixture was stirred for 10 minutes at normal temperature with a propeller stirrer. After each dispersion was heated to 80° C., 5.0 g of potassium chloride (anhydrous), 100.0 g of dextrin, 140.0 g, of caster sugar, and 40.0 g of soybean hemicellulose (SM-1200, San-Ei Gen F.F.I., Inc.) were added and mixed for 5 minutes using a propeller stirrer. Then the total amount of each mixture was adjusted to 1000.0 g with ion-exchanged water, thereby preparing solutions A-16 to A-19. The "casein Na" in the tables below designates "sodium caseinate".

TABLE 19

| | Content (g) | | | |
|---|---|---|---|---|
| | Protein with Emulsifiability Sodium Caseinate | Protein without Emulsifiability Soybean Peptide | Calcium Chloride (Dihydrate) | Trisodium Citrate |
| Solution A-16 | 40.0 | — | 2.3 | 10.4 |
| Solution A-17 | 40.0 | — | 4.6 | 16.0 |
| Solution A-18 | — | 40.0 | 2.3 | 10.4 |
| Solution A-19 | — | 40.0 | 4.6 | 16.0 |

Solutions B-20 and B-21

Solutions B-20 and E-21 were prepared in the same manner as that for preparing Solutions B-20 and B-21 in (4-1) above.

Examples 50 and 51 and Comparative Examples 22 and 23

Solutions A-16 to A-19 and solutions B-20 and B-21 were mixed at proportions shown in Table 20, and stirred with a Polytron type mixer (Silent Crusher M; Heidolph) at a rotation speed of 26,000 rpm for 30 seconds. Thereafter, 3.5 g of medium-chain fatty acid triglyceride (MCT, Nisshin OilliO Group Ltd.) was added and further stirred at a rotation speed of 26,000 rpm for 1 minute to prepare concentrated liquid foods of Examples 50 and 51 and Comparative Examples 22 and 23. These concentrated liquid foods had a pH of 6.2 to 7.0.

TABLE 20

| | Content (g) | | | | | | |
|---|---|---|---|---|---|---|---|
| | Solution | | | | | Ion-Exchanged Water | MCT |
| | A-18 | A-19 | A-20 | A-21 | B-22 | B-23 | | |
| Example 50 | 50.0 | — | — | — | 16.0 | — | 30.5 | 3.5 |
| Example 51 | — | 50.0 | — | — | — | 18.0 | 30.5 | 3.5 |
| Comparative Example 22 | — | — | 50.0 | — | 16.0 | — | 30.5 | 3.5 |
| Comparative Example 23 | — | — | — | 50.0 | — | 18.0 | 30.5 | 3.5 |

Results 6

Table 21 shows the viscosities of the concentrated liquid foods before and after contact with simulated gastric fluid, ratios of these viscosities (viscosity increasing rate), and stabilities (dispersion stabilities after storage) with the concentrated liquid foods having been left to stand for 2 days at 5° C.

TABLE 21

| Concentrated Liquid Food (Polysaccharide, Protein Concentration) | Viscosity before Contact (mPa·s) | Viscosity after Contact (mPa·s) | Viscosity Increasing Rate (Times) | Dispersion Stability after Storage |
|---|---|---|---|---|
| Example 50 (Pectin 0.96%, Sodium Caseinate 2.0%) | 80 | 3050 | 29.0 | AA |
| Example 51 (Sodium Alginate 0.54%, Sodium Caseinate 2.0%) | 136 | 10000 | 73.5 | AA |
| Comparative Example 22 (Pectin 0.96%, Soybean Peptide 2.0%) | 80 | 2850 | 35.6 | B |
| Comparative Example 23 (Sodium Alginate 0.54% Soybean Peptide 2.0%) | 60 | 2200 | 36.7 | C |

In the concentrated liquid foods of Examples 50 and 51 containing sodium caseinate, which is an unhydrolyzed milk protein having emulsifiability, the viscosities before contact with simulated gastric fluid were 250 mPa·s or less, and the viscosities after contact with simulated gastric fluid were 1,500 mPa·s or more. Further, after the concentrated liquid foods were left unattended for 2 days at 5° C., separation of oil layer, aggregation of proteins, and the like were hardly observed; the concentrated liquid foods were thus in a good condition. The liquid food using pectin as a polysaccharide that becomes gelated or thickened by combining with calcium, and the liquid food using sodium alginate as a polysaccharides that becomes gelated or thickened by combining with calcium have similar stabilities. The results suggested that the concentrated liquid foods of the present invention have a sufficiently low viscosity before contact with gastric fluid (upon injection), and this have high fluidity, that the concentrated liquid foods of the present invention are thickened in the stomach (after injection), thereby preventing gastro-esophageal reflux, and that the concentrated liquid foods of the present invention have desirable dispersion stabilities.

In contrast, in the concentrated liquid foods of Comparative Examples 22 and 23 containing unemulsifiable soybean peptide, although the viscosities before contact with simulated gastric fluid were 250 mPa·s or less and the viscosities after contact with simulated gastric fluid were 1,500 mPa·s or more, after these concentrated liquid foods were left to stand for 2 days at 5° C., apparent separation of oil layer and agglomerates were observed. In particular, the agglomerates generated in the concentrated liquid food of Comparative Example 23 could not be resuspended even by intense shaking. The results revealed that a protein having emulsifiability is necessary to ensure stable storage of the concentrated liquid food of the present invention.

Test Example 7

Concentrated liquid foods were prepared using Md-pectin, a pectin material, and a low molecular weight pectin according to method. (7-1) below, and the viscosities of these concentrated liquid foods before and after contact with simulated gastric fluid were evaluated according to method (1-2) above, and the appearances after contact with simulated gastric fluid were evaluated according to method (7-2) below.

(7-1) Preparation of Concentrated. Liquid Food 4.7 g of dextrin, 7.3 g of caster sugar, 0.40 g of calcium chloride (dihydrate), 0.34 g of magnesium chloride (hexahydrate), 0.12 q of potassium chloride (anhydrous), 2.0 g of soybean hemicellulose (SM-1200, San-Ei Gen F.F.I., Inc.), and 0.20 g of trisodium citrate were added to and mixed with 80 g of ion-exchanged water, and dispersed in the water. 3.5 g of sodium caseinate was added to the dispersion and stirred. 3.5 g of corn oil was added to and mixed with this dispersion. After stirring, 0.30 g of a pectin material (SAN SUPPORT™ P-161, San-Ei Gen F.F.I., Inc.), and Md-pectin in Table 22, a pectin material or a low molecular weight pectin in amounts specified in Table 23 were added and mixed, and the total amount of the mixture was adjusted to 100.0 g with ion-exchanged water. Each dispersion was subjected to a single homogenization at 14.7 MPa, thereby preparing concentrated liquid foods of Examples 52 to 55 and Comparative Examples 24 to 28. These concentrated liquid foods had a pH of 5.6 to 5.8.

TABLE 22

| | Md-Pectin | | | |
|---|---|---|---|---|
| | MDP-01 | MDP-02 | MDP-03 | MDP-04 |
| Example 52 | 1.2 g | — | — | — |
| Example 53 | — | 1.2 g | — | — |
| Example 54 | — | — | 1.2 g | — |
| Example 55 | — | — | — | 1.2 g |

TABLE 23

| | Pectin Material | | | |
|---|---|---|---|---|
| | SAN SUPPORT™ P-160 | SAN SUPPORT™ P-161 | Low-Molecular-Weight Pectin LP-01 | LP-02 |
| Comparative Example 24 | — | — | — | — |
| Comparative Example 25 | 1.2 g | — | — | — |
| Comparative Example 26 | — | 1.2 g | — | — |
| Comparative Example 27 | — | — | 1.2 g | — |
| Comparative Example 28 | — | — | — | 1.2 g |

(7-2) Observation of Appearance

The appearances of these concentrated liquid foods after contact with simulated gastric fluid were observed mainly in terms of separation of the gastric fluid portion and the concentrated liquid food portion. A separated simulated gastric fluid is observed as a transparent layer or a cloudy white semitransparent layer in an upper portion of the concentrated liquid food. The presence or absence of separation was evaluated at the following four levels.

AA (Excellent): Separation of the simulated gastric fluid layer was not observed.
A (Good): Separation of the simulated gastric fluid layer was slightly observed.
B (Normal): Separation of the simulated gastric fluid layer was observed.
C (Inferior) Separation of the simulated gastric fluid layer was significantly observed.

Results 7

Table 24 shows the viscosities of the concentrated liquid foods before and after contact with simulated gastric fluid, ratios of these viscosities (viscosity increasing rate), and the appearances.

TABLE 24

| | pH | Viscosity before Contact (mPa·s) | Viscosity after Contact (mPa·s) | Viscosity Increasing Rate (Times) | Appearance (Separation of Gastric Fluid Portion) |
|---|---|---|---|---|---|
| Example 52 | 5.7 | 125 | 4560 | 36.5 | AA |
| Example 53 | 5.6 | 166 | 6640 | 40.0 | AA |
| Example 54 | 5.6 | 186 | 7050 | 37.9 | AA |
| Example 55 | 5.6 | 150 | 5560 | 37.1 | AA |
| Comparative Example 24 | 5.8 | 92 | 1250 | 13.6 | AA |
| Comparative Example 25 | 5.7 | 1262 | 1500 | 1.2 | C |
| Comparative Example 26 | 5.6 | 2560 | 6150 | 2.4 | C |
| Comparative Example 27 | 5.8 | 110 | 930 | 8.5 | A |
| Comparative Example 28 | 5.7 | 118 | 1010 | 8.6 | A |

In the concentrated liquid foods of Examples 52 to 55, the viscosities before contact with simulated gastric fluid were 250 mPa·s or less, and the viscosities after contact with simulated gastric fluid were 2000 mPa·s or more. Further, the observation of the appearances of these concentrated liquid foods after contact with simulated gastric fluid revealed that the concentrated liquid foods of Examples 52 to 55 form a viscous sol together with simulated gastric fluid.

When the viscosity according to the viscosity measurement method is 250 mPa·s or less, it is possible to cause the liquid food to flow (flow out) only by gravity even when the liquid food is supplied via a nasal thin tube. Therefore, the concentrated liquid food of the present invention can reduce the burden of the caregiver and the person receiving care, and also sufficiently thickened in the stomach, thereby preventing gastro-esophageal reflux.

In contrast, in the concentrated liquid food of Comparative Example 24 that contains 0.3% of a pectin material but does not contain Md-pectin, although the viscosity before contact with simulated gastric fluid was 250 mPa·s or less, the viscosity after contact with simulated gastric fluid was 1,500 mPa·s or less, and sufficient viscosity increase was not observed. Further, in Comparative Examples 25 and 26 containing 1.5 mass % of pectin material in total, the viscosities before contact with simulated gastric fluid were significantly high; further, after the concentrated liquid foods came in contact with simulated gastric fluid, the concentrated liquid foods and simulated gastric fluid were not mixed but separated.

In Comparative Examples 27 and 28 containing a low molecular weight pectin, although the viscosities before contact with simulated gastric fluid were 250 mPa·s or less, which was sufficiently low, the viscosities after contact with simulated gastric fluid were 1,500 mPa·s or less, and sufficient viscosity increase was not observed. Further, the observation of the appearances of these concentrated liquid foods revealed that the sol-like concentrated liquid food portion and gastric fluid portion were slightly separated.

The above results revealed that the concentrated liquid foods containing Md-pectin can be easily injected, become thickened in the stomach, and are not separated from simulated gastric fluid when they are thickened and can be combined with simulated gastric fluid. It was thus revealed that the use of Md-pectin enables the preparation of a concentrated liquid food that more easily prevents gastro-esophageal reflux.

Test Example 8

Concentrated liquid foods were prepared using Md-alginic acid, an alginic acid material and a low molecular weight sodium alginate according to method (8-1) below, and the viscosities of the concentrated liquid foods before and after contact with simulated gastric fluid were evaluated according to method (1-2) above, and the appearances after contact with simulated gastric fluid were evaluated according to method (7-2) above.

(8-1) Preparation of Concentrated Liquid Food 4.7 g of dextrin, 7.3 g of caster sugar, 0.40 g of calcium chloride (dihydrate), 0.34 g of magnesium chloride (hexahydrate), 0.12 g of potassium chloride (anhydrous), 2.0 g of soybean hemicellulose (SM-1200, San-Ei Gen F.F.I., Inc.) and 0.20 g of trisodium citrate were added to and mixed with 80 g of ion-exchanged water, and dispersed in the water. 3.5 g of sodium caseinate was added to the dispersion and stirred. 3.5 g of corn oil was added to and mixed with this dispersion. After stirring, 0.30 a, of sodium alginate (SAN SUPPORT™ P-71, San-Ei Gen F.F.I., Inc.), and Md-alginic acid in the amount specified in Table 25, or an alginic acid material or a low molecular weight sodium alginate in the amounts specified in Table 26 were added, and the total amount of the mixture was adjusted to 100.0 g with ion-exchanged water. Each dispersion was subjected to a single homogenization at 14.7 MPa, thereby preparing concentrated liquid foods of Examples 56 to 59 and Comparative Examples 29 to 33. These concentrated liquid foods had a pH of 6.8 to 7.0.

TABLE 25

| | Md-Alginic acid | | | |
|---|---|---|---|---|
| | MDA-01 | MDA-02 | MDA-03 | MDA-04 |
| Example 56 | 0.4 g | — | — | — |
| Example 57 | — | 0.4 g | — | — |
| Example 58 | — | — | 0.4 g | — |
| Example 59 | — | — | — | 0.4 g |

TABLE 26

| | Alginic Acid Material | | | |
|---|---|---|---|---|
| | SAN SUPPORT™ P-80 | SAN SUPPORT™ P-71 | Low-Molecular-Weight Sodium Alginate | |
| | | | LA-01 | LA-02 |
| Comparative Example 29 | — | — | — | — |
| Comparative Example 30 | 0.4 g | — | — | — |
| Comparative Example 31 | — | 0.4 g | — | — |
| Comparative Example 32 | — | — | 0.4 g | — |
| Comparative Example 33 | — | — | — | 0.4 g |

Results 8

Table 27 shows the viscosities of the concentrated liquid foods before and after contact with simulated gastric fluid, ratios of these viscosities (viscosity increasing rate), and their appearances.

TABLE 27

| | pH | Viscosity before Contact (mPa·s) | Viscosity after Contact (mPa·s) | Viscosity Increasing Rate (Times) | Appearance (Separation of Gastric Fluid Portion) |
|---|---|---|---|---|---|
| Example 56 | 6.8 | 152 | 5260 | 34.6 | AA |
| Example 57 | 6.9 | 115 | 4840 | 42.1 | AA |
| Example 58 | 6.9 | 181 | 6770 | 37.4 | AA |
| Example 59 | 6.8 | 133 | 4450 | 33.5 | AA |
| Comparative Example 29 | 6.8 | 85 | 1260 | 21.9 | C |
| Comparative Example 30 | 6.8 | 354 | 2500 | 7.1 | C |
| Comparative Example 31 | 6.9 | 450 | 4150 | 9.2 | C |
| Comparative Example 32 | 6.8 | 108 | 1310 | 14.0 | A |
| Comparative Example 33 | 7.0 | 128 | 1460 | 14.5 | B |

In the concentrated liquid foods of Examples 56 to 59, the viscosities before contact with simulated gastric fluid were 250 mPa·s or less, and the viscosities after contact with simulated gastric fluid were 1,500 mPa·s or more. Further, the observation of their appearances after contact with simulated gastric fluid revealed that the concentrated liquid foods of Examples 56 to 59 form a soft gel; the concentrated liquid foods were gelated together with the simulated gastric fluid captured therein.

When the viscosity according to the viscosity measurement method is 250 mPa·s or less, it is possible to cause the liquid food to flow (flow out) only by gravity even when the liquid food is supplied via a nasal thin tube. Therefore, the concentrated liquid food of the present invention can reduce the burden of the caregiver and the person receiving care, and also sufficiently thickened in the stomach, thereby preventing gastro-esophageal reflux.

In contrast, in the concentrated liquid food of Comparative Example 29 that contains 0.3 mass % of an alginic acid material but does not contain Md-alginic acid, although the viscosity before contact with simulated gastric fluid was low, thus enabling easy injection, the viscosity after contact with simulated gastric fluid was 1,500 mPa·s or less, and sufficient viscosity increase was not observed. Further, in Comparative Examples 30 and 31 containing 0.7 mass % of alginic acid material in total but do not contain Md-alginic acid, the viscosities before contact with simulated gastric fluid were excessively high. Further, the appearances of Comparative Examples 29 to 31 after contact with simulated gastric fluid were observed, with the result that the gelated concentrated liquid food portion and gastric fluid portion were separated. Although the gelated concentrated liquid food portion does not cause gastro-esophageal reflux, the separated gastric fluid portion may cause gastro-esophageal reflux due to its low viscosity.

In Comparative Examples 32 and 33 that contain low molecular weight alginic acid but do not contain Md-alginic acid, although the viscosities before contact with simulated gastric fluid were 250 mPa·s or less, which are sufficiently low, the viscosities after contact with simulated gastric fluid were 2,000 mPa·s or less, and sufficient viscosity increase was not observed. Further, the observation of their appearances revealed that the gelated concentrated liquid food portion and gastric fluid portion were slightly separated.

The above results revealed that the concentrated liquid foods containing Md-alginic acid can be easily injected, are thickened in the stomach, and are not separated from simulated gastric fluid when they are thickened and can be combined with simulated gastric fluid. It was thus revealed that the use of Md-alginic acid enables the preparation of a concentrated liquid food that more easily prevents gastro-esophageal reflux.

Test Example 9

Concentrated liquid foods were prepared according to method (9-1) below. Further, the viscosities of the concentrated liquid foods before and after contact with simulated gastric fluid were evaluated according to method (1-2) above, and the tube fluidities were evaluated according to method (1-3). Further, according to method (4-2) above, the stabilities of the concentrated liquid foods were evaluated after they were left to stand for 2 days at 5° C.

(9-1) Preparation of Concentrated Liquid Food 13.63 g of dextrin, 2.80 g of medium-chain triglyceride (O.D.O, Nisshin OilliO Group Ltd.), 3.08 g of sodium caseinate, and 2.39 g of milk protein isolate (WPI, CP Kelco) were added to 50 g of ion-exchanged water, and dispersed by mixing for 10 minutes. The dispersion was heated to 80° C., and 0.20 g of Homogen™ 897 (San-Ei Gen F.F.I., Inc.), which is an emulsifier preparation, 0.52 g of microcrystalline cellulose, 2.0 g of soybean hemicellulose (SM-1200, San-Ei Gen. F.F.I., Inc.), and a pectin or a sodium alginate in the amounts specified in Table 28 were added and mixed for 10 minutes, thereby being dispersed. The resulting dispersion was cooled to 20° C. to 25° C. (hereinafter referred to as "room temperature"), and 0.25% of potassium chloride and calcium triphosphate (a water-insoluble calcium source) in the amount specified in Table 28 were added and mixed for 10 minutes, thereby being dispersed. Then the total amount was adjusted to 100.0 g with ion-exchanged water. This dispersion was homogenized two times at 50.0 MPa, and further subjected to retort sterilization for 10 minutes at 121° C., thereby preparing concentrated liquid foods of Examples 56 to 59 and Comparative Examples 29 to 33. These concentrated liquid foods had a pH of 6.8 to 7.0.

before contact with simulated gastric fluid were low, thus enabling easy injection, the viscosities after contact with simulated gastric fluid were 1,500 mPa·s or less, and sufficient viscosity increase was not observed.

The above results revealed that a calcium source is indispensable in the preparation of the concentrated liquid food of the present patent that can be easily injected, and is thickened in the stomach to prevent gastro-esophageal

TABLE 28

| | Pectin | | | Sodium Alginate | | | |
| --- | --- | --- | --- | --- | --- | --- | --- |
| | SAN SUPPORT™ P-161 | SAN SUPPORT™ P-162 | MDP-01 | SAN SUPPORT™ P-80 | SAN SUPPORT™ P-70 | SAN SUPPORT™ P-90 | Tricalcium Phosphate |
| Example 60 | 1.07 g | 0.13 g | — | — | — | — | 0.33 g |
| Example 61 | 1.07 g | — | 0.13 g | — | — | — | 0.33 g |
| Example 62 | — | — | — | 0.36 g | 0.12 g | — | 0.33 g |
| Example 63 | — | — | — | 0.36 g | — | 0.12 g | 0.33 g |
| Example 64 | — | — | — | 0.36 g | — | 0.12 g | 0.26 g |
| Example 65 | — | — | — | 0.36 g | — | 0.12 g | 0.20 g |
| Comparative Example 34 | 1.07 g | — | 0.13 g | — | — | — | — |
| Comparative Example 35 | — | — | — | 0.36 g | 0.12 g | — | — |

Results 9

Table 29 shows the viscosities of the concentrated liquid foods before and after contact with simulated gastric fluid, ratios of these viscosities (viscosity increasing rate), and their appearances.

reflux. On the other hand, since the concentrated liquid foods of Examples 60 to 65 did not contain a chelating agent, it was also confirmed that a chelating agent is not indispensable when a water-insoluble calcium source is used.

TABLE 29

| | pH | Calcium Content | Viscosity before Contact (mPa·s) | Viscosity after Contact (mPa·s) | Viscosity Increasing Rate (Times) | Tube Fluidity (mL/h) | Appearance (Separation of Gastric Fluid Portion) |
| --- | --- | --- | --- | --- | --- | --- | --- |
| Example 60 | 5.5 | 0.125% | 195 | 3600 | 18.5 | 485 | A |
| Example 61 | 5.6 | 0.125% | 162 | 4250 | 26.2 | 800 | AA |
| Example 62 | 6.3 | 0.125% | 212 | 5200 | 24.5 | 455 | A |
| Example 63 | 6.2 | 0.125% | 138 | 4400 | 31.9 | 1270 | AA |
| Example 64 | 6.3 | 0.100% | 169 | 3520 | 20.8 | 860 | AA |
| Example 65 | 6.3 | 0.075% | 170 | 3200 | 18.8 | 820 | AA |
| Comparative Example 34 | 6.4 | — | 175 | 126 | 0.7 | 780 | AA |
| Comparative Example 35 | 6.4 | — | 188 | 150 | 0.8 | 650 | AA |

In the concentrated liquid foods of Examples 60 to 65 containing pectin, Md-pectin, alginate and/or Md-alginic acid, and a water-insoluble calcium source, the viscosities before contact with simulated gastric fluid were 250 mPa·s or less, and the viscosities after contact with simulated gastric fluid were 1,500 mPa·s or more. Further, the observation of their appearances after contact with simulated gastric fluid revealed that the concentrated liquid foods of Examples 61, and 63 to 65 containing MDP-01 or SAN SUPPORT™ P-90 as Md-pectin or Md-alginic acid form a soft gel in which the concentrated liquid foods are gelated together with the simulated gastric fluid captured therein; in contrast, in the concentrated liquid foods of Examples 60 and 62 that did not contain Md-pectin or Md-alginic acid, separation of the simulated gastric fluid layer was slightly observed.

In contrast, in the concentrated liquid foods of Comparative Examples 34 and 35 that do not contain Md-pectin or alginate and/or Md-alginic acid, although the viscosities

INDUSTRIAL APPLICABILITY

The present invention provides a concentrated liquid food that enables easy injection and suppresses gastro-esophageal reflux.

The invention claimed is:
1. A concentrated liquid food, comprising:
   (A) a polysaccharide that becomes gelated or thickened by combining with calcium and comprises one or more members selected from the group consisting of pectins, and alginic acids or salts thereof;
   (B) 0.005 mass % to 0.25 mass % on a calcium basis of a calcium source,
   wherein the calcium source (B) is at least one water-soluble calcium source selected from the group consisting of calcium chloride, calcium sulfate, calcium citrate, calcium gluconate, calcium monohydrogen phosphate, and calcium dihydrogen phosphate, or the calcium source (B) is at least one water-insoluble calcium source selected from the group consisting of calcined calcium, uncalcined calcium, calcium carbonate, and calcium trihydrogen phosphate, and hydrates thereof;

optional (C) 0.05 mass % to 2.0 mass % of a chelating agent;

(D) 0.5 mass % to 10.0 mass % of a protein having emulsifiability; and (E) a soybean hemicellulose, wherein the pectin has a weight average molecular weight (Mw) of 150,000 g/mol or less, and the pectin contains a pectin having a degree of methyl esterification (DM) of 20% to 40% in an amount of 50 mass % or more, or the pectin comprises:

(1) a pectin having a weight average molecular weight (Mw) of 100,000 g/mol or less, and a degree of methyl esterification (DM) of 40% or less; and (2) a pectin having a Mw of 100,000 g/mol or more;

wherein the alginic acid or the salt thereof comprises:

(1) an alginic acid or a salt thereof having a weight average molecular weight (Mw) of 250,000 g/mol or less and a guluronic acid content of not less than 40% and less than 60%; and (2) an alginic acid or a salt thereof having a weight average molecular weight (Mw) of 250,000 g/mol or less, and a guluronic acid content of 60% or more, or the alginic acid or the salt thereof comprises:

(1) an alginic acid or a salt thereof having a weight average molecular weight (Mw) of 100,000 g/mol or less, and a guluronic acid content of 60% or more; and (2) an alginic acid or a salt thereof having a Mw of 100,000 g/mol or more, wherein, when the calcium source (B) is a water-soluble calcium source, the concentrated liquid food comprises the chelating agent (C), a viscosity of the concentrated liquid food measured under viscosity measurement conditions as defined below is 250 mPa·s or less before contact with a simulated gastric fluid, and is 1,500 mPa·s or more after contact with a simulated gastric fluid, and the pH of the concentrated liquid food is 4.8 to 9.0, wherein the viscosity measurement conditions are as follows:

viscosity measured using a Brookfield rotational viscometer, measurement temperature: 20° C., and rotation rate: 6 rpm;

the viscosity before contact with gastric fluid is measured by placing 80 g of the concentrated liquid food in a cylindrical glass tube with an inner diameter of 35 mm and a height of 100 mm that can be hermetically sealed with a cap, and measuring the viscosity; and the viscosity after contact with gastric fluid is measured by placing 16 g of simulated gastric fluid which is an aqueous solution containing 0.7% hydrochloric acid and 0.2% common salt and having a pH of 1.2 in a cylindrical glass tube, adding 64 g of the concentrated liquid food, sealing the cylindrical glass tube with a cap, and shaking the glass tube upside-down five times so as to mix the simulated gastric fluid with the concentrated liquid food, leaving the mixture to stand at 38° C. for 30 minutes, returning the temperature to 20° C., and measuring the viscosity.

2. The concentrated liquid food according to claim 1, wherein the concentrated liquid food comprises the pectin in an amount of 0.5 mass % to 1.8 mass %.

3. The concentrated liquid food according to claim 1, wherein the alginic acid or a salt thereof is sodium alginate.

4. The concentrated liquid food according to claim 1, wherein the concentrated liquid food contains an alginic acid or a salt thereof in an amount of 0.2 mass % to 1.2 mass %.

5. The concentrated liquid food according to claim 1, wherein the chelating agent (C) is citrate.

6. The concentrated liquid food according to claim 1, wherein the protein having emulsifiability (D) is an unhydrolyzed protein derived from milk.

7. The concentrated liquid food according to claim 1, wherein the concentrated liquid food comprises the soybean hemicellulose (E) in an amount of 0.2 mass % to 5.0 mass %.

8. The concentrated liquid food according to claim 1, wherein a tube fluidity measured by a tube fluidity measurement method as defined below is 300 mL/hour or more:

Tube Fluidity Measurement Method

Step 1: 100 mL of a sample is placed in a 600-mL plastic bottle with an opening at an upper portion;

Step 2: a flexible silicone tube with an inner diameter of 4 mm and a length of 1000 mm is connected to the bottom of the plastic bottle;

Step 3: the bottom surface of the plastic bottle is placed 600 mm above the end of the tube so that the sample flows out only by gravity via the tube; and Step 4: the flow amount A (mL) of the sample that flows out in 2 minutes is measured with a measuring cylinder, and A×30 (mL/hour) is determined as the tube fluidity of the concentrated liquid food.

9. The concentrated liquid food according to claim 1, wherein the concentrated liquid food is used for injection through nasogastric or oral tube feeding, or gastrostomy or jejunostomy tube feeding.

10. The concentrated liquid food according to claim 1, wherein when the calcium source (B) is a water-soluble calcium source, the concentrated liquid food comprises the chelating agent (C), and when the calcium source (B) is a water-insoluble calcium source, the concentrated liquid food does not comprise the chelating agent (C).

11. A concentrated liquid food, comprising:

(A) an alginic acid or a salt thereof;

(B) 0.005 mass % to 0.25 mass % on a calcium basis of a calcium source, wherein the calcium source (B) is at least one water-soluble calcium source selected from the group consisting of calcium chloride, calcium sulfate, calcium citrate, calcium gluconate, calcium monohydrogen phosphate, and calcium dihydrogen phosphate, or wherein the calcium source (B) is at least one water-insoluble calcium source selected from the group consisting of calcined calcium, uncalcined calcium, calcium carbonate, and calcium trihydrogen phosphate, and hydrates thereof;

optional (C) 0.05 mass % to 2.0 mass % of a chelating agent;

(D) 0.5 mass % to 10.0 mass % of a protein having emulsifiability; and (E) a soybean hemicellulose, wherein when the calcium source (B) is a water-soluble calcium source, the concentrated liquid food comprises the chelating agent (C), a viscosity of the concentrated liquid food measured under viscosity measurement conditions as defined below is 250 mPa·s or less before contact with a simulated gastric fluid, and is 1,500 mPa·s or more after contact with a simulated gastric fluid, and the alginic acid or the salt thereof comprises:
(1) an alginic acid or a salt thereof having a weight average molecular weight (Mw) of 250,000 g/mol or less and a guluronic acid content of not less than 40% and less than 60%; and
(2) an alginic acid or a salt thereof having a weight average molecular weight (Mw) of 250,000 g/mol or less, and a guluronic acid content of 60% or more,
wherein the viscosity measurement conditions are as follows:
viscosity measured using a Brookfield rotational viscometer,
measurement temperature: 20° C., and
rotation rate: 6 rpm;
the viscosity before contact with gastric fluid is measured by placing 80 g of the concentrated liquid food in a cylindrical glass tube with an inner diameter of 35 mm and a height of 100 mm that can be hermetically sealed with a cap, and measuring the viscosity; and
the viscosity after contact with gastric fluid is measured by placing 16 g of simulated gastric fluid which is an aqueous solution containing 0.7% hydrochloric acid and 0.2% common salt and having a pH of 1.2 in a cylindrical glass tube, adding 64 g of the concentrated liquid food, sealing the cylindrical glass tube with a cap, and shaking the glass tube upside-down five times so as to mix the simulated gastric fluid with the concentrated liquid food, leaving the mixture to stand at 38° C. for 30 minutes, returning the temperature to 20° C., and measuring the viscosity.

12. A concentrated liquid food, comprising:
(A) an alginic acid or a salt thereof;
(B) 0.005 mass % to 0.25 mass % on a calcium basis of a calcium source,
wherein the calcium source (B) is at least one water-soluble calcium source selected from the group consisting of calcium chloride, calcium sulfate, calcium citrate, calcium gluconate, calcium monohydrogen phosphate, and calcium dihydrogen phosphate, or
wherein the calcium source (B) is at least one water-insoluble calcium source selected from the group consisting of calcined calcium, uncalcined calcium, calcium carbonate, and calcium trihydrogen phosphate, and hydrates thereof;
optional (C) 0.05 mass % to 2.0 mass % of a chelating agent;
(D) 0.5 mass % to 10.0 mass % of a protein having emulsifiability; and
(E) a soybean hemicellulose,
wherein when the calcium source (B) is a water-soluble calcium source, the concentrated liquid food comprises the chelating agent (C),
a viscosity of the concentrated liquid food measured under viscosity measurement conditions as defined below is 250 mPa·s or less before contact with a simulated gastric fluid, and is 1,500 mPa·s or more after contact with a simulated gastric fluid, and
the alginic acid or the salt thereof comprises:
(1) an alginic acid or a salt thereof having a weight average molecular weight (Mw) of 100,000 g/mol or less, and a guluronic acid content of 60% or more; and
(2) an alginic acid or a salt thereof having a Mw of 100,000 g/mol or more,
wherein the viscosity measurement conditions are as follows:
viscosity measured using a Brookfield rotational viscometer,
measurement temperature: 20° C., and
rotation rate: 6 rpm;
the viscosity before contact with gastric fluid is measured by placing 80 g of the concentrated liquid food in a cylindrical glass tube with an inner diameter of 35 mm and a height of 100 mm that can be hermetically sealed with a cap, and measuring the viscosity; and
the viscosity after contact with gastric fluid is measured by placing 16 g of simulated gastric fluid which is an aqueous solution containing 0.7% hydrochloric acid and 0.2% common salt and having a pH of 1.2 in a cylindrical glass tube, adding 64 g of the concentrated liquid food, sealing the cylindrical glass tube with a cap, and shaking the glass tube upside-down five times so as to mix the simulated gastric fluid with the concentrated liquid food, leaving the mixture to stand at 38° C. for 30 minutes, returning the temperature to 20° C., and measuring the viscosity.

* * * * *